(12) United States Patent
Eplee

(10) Patent No.: US 11,117,292 B2
(45) Date of Patent: Sep. 14, 2021

(54) FLUIDIZED BED ROTATIONAL MOLDING

(71) Applicant: Dustin Eplee, Lancaster, PA (US)

(72) Inventor: Dustin Eplee, Lancaster, PA (US)

(*) Notice: Subject to any disclaimer, the term of this patent is extended or adjusted under 35 U.S.C. 154(b) by 91 days.

(21) Appl. No.: 16/407,941

(22) Filed: May 9, 2019

(65) Prior Publication Data

US 2020/0353654 A1 Nov. 12, 2020

(51) Int. Cl.
| | |
|---|---|
| *B29C 41/06* | (2006.01) |
| *B29C 41/10* | (2006.01) |
| *B29C 41/36* | (2006.01) |
| *B29C 41/46* | (2006.01) |
| B29K 105/00 | (2006.01) |
| B29K 23/00 | (2006.01) |

(52) U.S. Cl.
CPC .............. *B29C 41/06* (2013.01); *B29C 41/10* (2013.01); *B29C 41/36* (2013.01); *B29C 41/46* (2013.01); *B29K 2023/06* (2013.01); *B29K 2023/12* (2013.01); *B29K 2105/251* (2013.01)

(58) Field of Classification Search
CPC ......... B29C 41/06; B29C 41/10; B29C 41/36; B29C 41/46
See application file for complete search history.

(56) References Cited

U.S. PATENT DOCUMENTS

| | | | |
|---|---|---|---|
| 3,164,654 A | | 1/1965 | Spencer |
| 3,250,643 A | * | 5/1966 | Sergent .................. B08B 7/0085 134/2 |
| 4,629,409 A | * | 12/1986 | Satoh ...................... B29C 33/72 414/732 |
| 4,695,244 A | * | 9/1987 | Friesen ................... B29C 41/06 425/429 |
| 4,738,815 A | | 4/1988 | Friesen |
| 4,790,510 A | * | 12/1988 | Takamatsu .............. B29C 31/04 249/117 |
| 4,946,638 A | * | 8/1990 | Takamatsu .......... B29C 35/0244 249/137 |
| 5,316,810 A | | 5/1994 | Rogerson |
| 5,718,929 A | | 2/1998 | Rogerson |
| 6,499,529 B1 | | 12/2002 | Farkas |
| 2004/0096608 A1 | | 5/2004 | King et al. |

(Continued)

FOREIGN PATENT DOCUMENTS

| | | | | |
|---|---|---|---|---|
| GB | 1228745 A | * | 4/1971 | ........... B29C 35/007 |
| JP | 2639977 B2 | | 8/1997 | |

OTHER PUBLICATIONS

International Search Report and Written Opinion dated Jul. 17, 2019, in International Application No. PCT/US2019/31593 (8 pgs.).

*Primary Examiner* — Robert B Davis

(74) *Attorney, Agent, or Firm* — Finnegan, Henderson, Farabow, Garrett & Danner, LLP

(57) ABSTRACT

Embodiments of the present disclosure include a rotational molding device. The rotational molding device comprises a frame, a vessel coupled to the frame and configured to be heated or cooled, and a mold coupled to the frame and configured to rotate about a first axis by a first rotation mechanism and configured to rotate about a second axis by a second rotation mechanism. The vessel includes a particle bed comprising a plurality of fluidized particles, the mold is configured to form a molded part, and the mold includes a cavity corresponding to a shape of the molded part.

19 Claims, 22 Drawing Sheets

(56) References Cited

U.S. PATENT DOCUMENTS

2005/0040563 A1    2/2005   Lang et al.
2005/0245676 A1   11/2005   Winckler et al.
2008/0181981 A1    7/2008   Schuessler \* cited by examiner

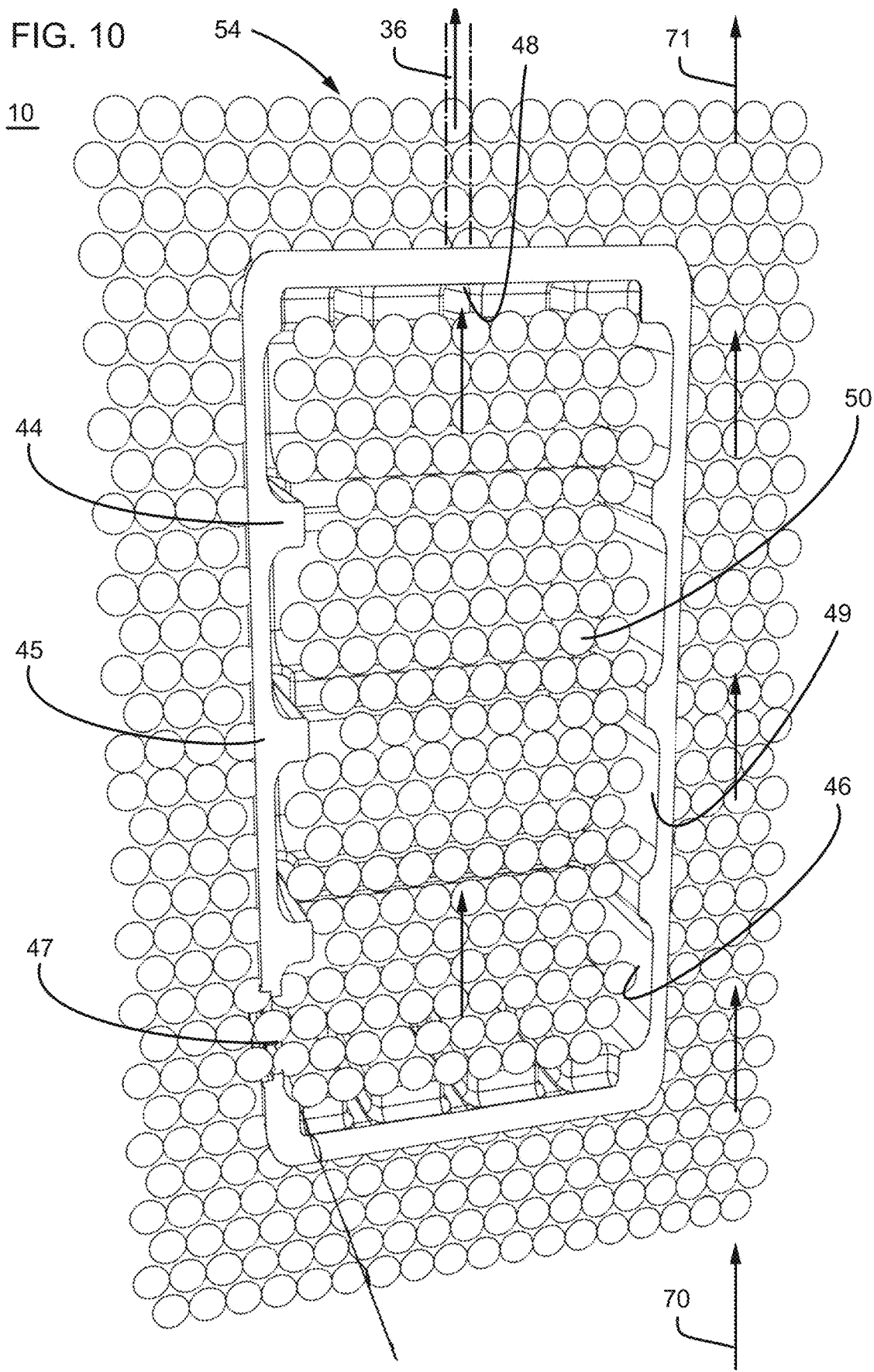

13

13

13

FLUIDIZED BED ROTATIONAL MOLDING

FIELD OF THE DISCLOSURE

Embodiments of the present disclosure include rotational molding devices and components thereof, and more particularly, systems for heating and cooling thermoplastic molds and/or hollow thermoplastic parts using heated or cooled fluidized beds on the external and/or internal surfaces of molds and/or molded parts.

BACKGROUND OF THE DISCLOSURE

Generally, conventional rotational molding methods rely on convection air heating and cooling of thin-walled metal shells to form hollow thermoplastic parts. Air convective heat transfer may result in uneven heating resulting in rotationally molded parts exhibiting holes and inconsistent wall thickness. Furthermore, uneven cooling may warp parts and produce parts with variable dimensions. Conventional rotational molding methods are characterized by long cycle times and related high energy consumption. Slow heat transfer associated with convection air may limit resins to those with lower formation temperatures and higher degrees of thermal degradation resistance.

Since the inception of rotational molding, external convection air-heating and -cooling has driven mold design towards ever thinner and more fragile wall constructions to reduce cycle times and energy consumption. Yet, restrictive design parameters on the feasibility of undercuts and concave design elements exist with conventional convective air currents. They were only partially resolved using additional venturi-style nozzles or air pipes. Attempts have been made to address the durability of aluminum molds by, for example, welding substantial steel exoskeletons for support. These attempts have resulted in stresses from dissimilar metals and increased cost and complexity.

Electric heating systems, fastened to or embedded within a mold, have been proposed for thermoplastic part formation. Electric heating systems fail to address the cooling cycle. Electrification of a mold results in a substantial increase in cost and requires expensive machinery with complex rotary unions. Pressurized oil heating and cooling systems have been proposed. These decompose with elevated temperatures and present fire and safety concerns for operators in intimate contact with molds. Induction and microwave-based heating may be difficult to manage effectively due to the wide variety of shapes and sizes in the rotational molding industry. Internal convective conditioning using compressed air, water vapor, nitrogen gas, and vacuum may provide only incremental improvements in part quality and production speed. Finally, advanced controls and monitoring of molds within ovens and during cooling cycles have been employed with only modest gains in part quality and cycle times.

There remains a need for improved rotational molding devices that heat and cool the molds and parts effectively and enable the formation of hollow thermoplastic parts in a reliable and cost-effective manner. The present invention proposes using heated or cooled fluidized beds on the external and/or internal surfaces of molds.

SUMMARY OF THE DISCLOSURE

In accordance with an embodiment, a rotational molding device may comprise a frame, a vessel coupled to the frame and configured to be heated or cooled, and a mold coupled to the frame and configured to rotate about a first axis by a first rotation mechanism and configured to rotate about a second axis by a second rotation mechanism. The vessel may include a particle bed comprising a plurality of fluidized particles, the mold may be configured to form a molded part, and the mold may include a cavity corresponding to a shape of the molded part.

In accordance with another embodiment, a rotational molding device may comprise a frame, a vessel coupled to the frame, and a mold coupled to the frame and configured to rotate about a first axis by a first rotation mechanism and configured to rotate about a second axis by a second rotation mechanism. The vessel may include a particle bed comprising a plurality of fluidized particles, the mold may be configured to form a molded part, the mold may include a cavity corresponding to a shape of the molded part, and the mold may include at least one aperture configured to selectively circulate the fluidized particles into and out of the cavity to heat or cool the molded part.

In accordance with yet another embodiment, a rotational molding system may comprise a frame, a vessel coupled to the frame and configured to be heated or cooled, a mold coupled to the frame and configured to rotate about a first axis by a first rotation mechanism and configured to rotate about a second axis by a second rotation mechanism, and an injection unit configured to deposit molten thermoplastic material into a cavity of the mold to form a molded thermoplastic part. The vessel may include a particle bed comprising a plurality of fluidized particles, and the cavity of the mold may correspond to a shape of the molded thermoplastic part.

BRIEF DESCRIPTION OF THE DRAWINGS

FIG. 10 illustrates a cross-sectional perspective view of an exemplary external and internal fluidized bed rotational molding device, according to an exemplary disclosed embodiment;

DETAILED DESCRIPTION

Reference will now be made in detail to the exemplary embodiments of the present disclosure described above and illustrated in the accompanying drawings.

Figure 1:
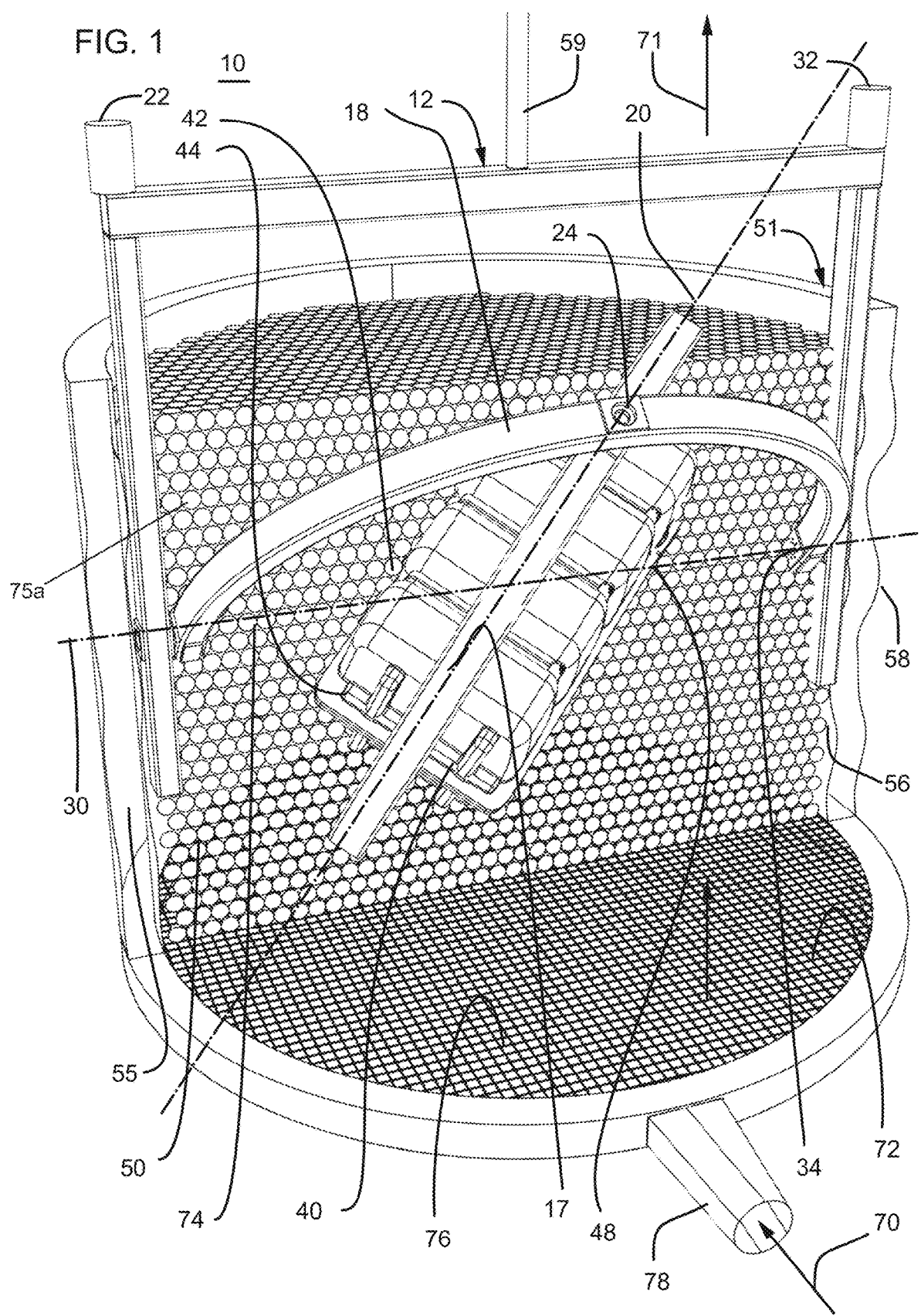
FIG. 1 illustrates a cross-sectional perspective view of an exemplary fluidized bed rotational molding device facilitating 360° continuous rotation about two or more orthogonal axis, according to an exemplary disclosed embodiment.
Figure 2:
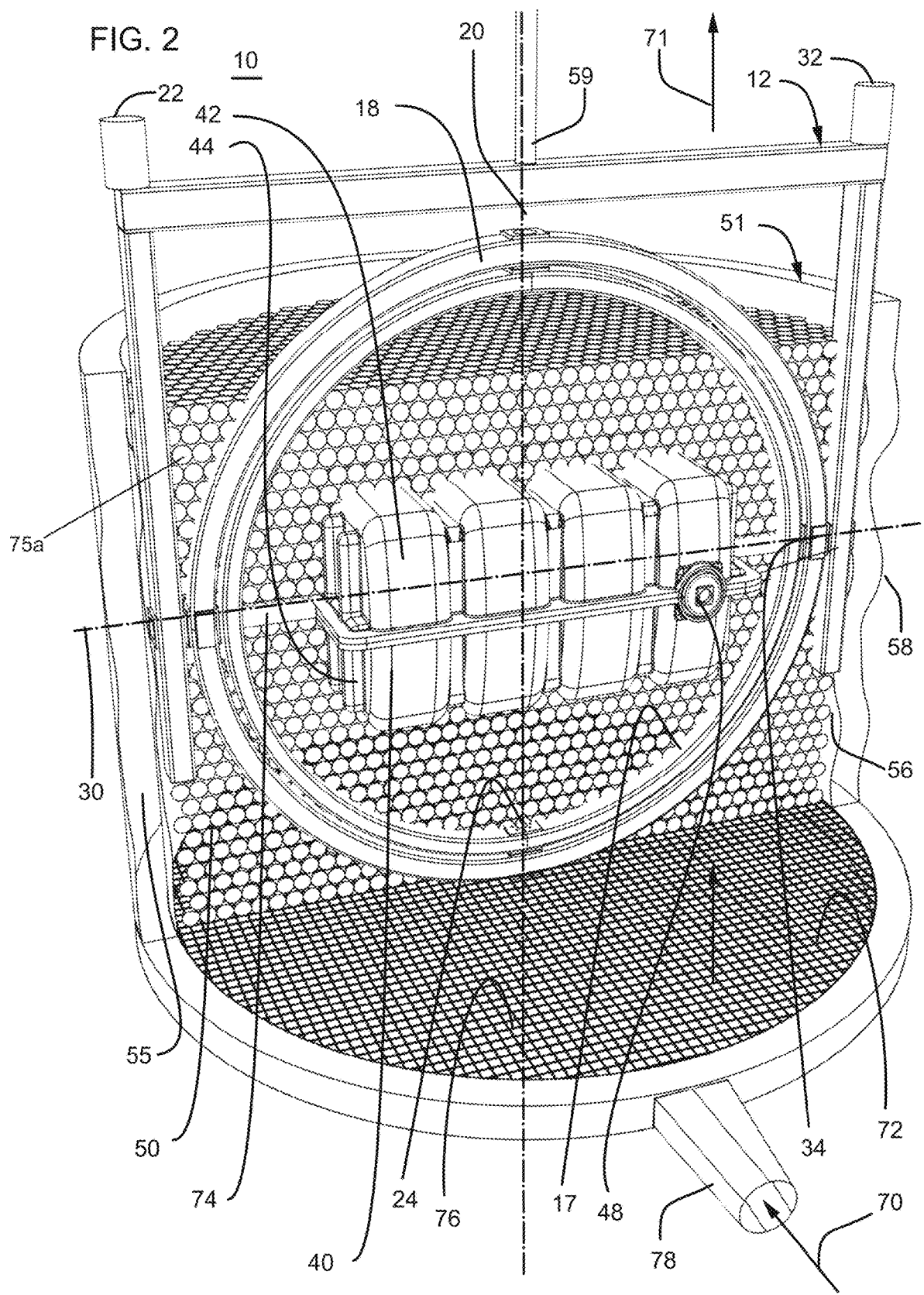
FIG. 2 illustrates another cross-sectional perspective view of the exemplary fluidized bed rotational molding device of FIG. 1, according to an exemplary disclosed embodiment.

FIGS. 1 and 2 illustrate cross sectional views of an exemplary rotational molding device 10 according to the present disclosure. In some embodiments, rotational molding device 10 may comprise a rotating mold 40 and a fluidized vessel 51 that may be heated or cooled. The rotational molding device 10 may further comprise a frame 12 configured for movement along a first axis 20 and a second axis 30 orthogonal to first axis 20. Movement along first axis 20 and second axis 30 may be powered by a first power source 22 and a second power source 32, respectively. In some embodiments, one or more first axis rotating joints 24 may be disposed within a first axis support 17, such as, for example, an inner structural ring, and may facilitate 360°, continuous rotation about first axis 20. Additionally, and/or alternatively, one or more second axis rotating joints 34 may be disposed within a second axis support 18, such as, for example, an outer structural ring, and may facilitate 360°, continuous rotation about second axis 30. A mold 40 may be disposed on first and second axes 20, 30 by mold offset base 74. Mold 40 may further comprise a mold base 44 and a removable mold lid 42.

Heated or cooled fluidized vessel 51 may comprise a base plenum 76, a gas distributor 72, a vessel inner wall 56, and a vessel outer wall 58. Heated or cooled vessel 51 may contain fluidized bed particles 50. A pressurized air flow 70 may enter base plenum 76 via an inlet pipe 78. A particle bed 75a may comprise fluidized bed particles 50. In some embodiments, particles 50 may have a degree of sphericity between 0.80 and 1.0, an angle of internal friction ranging from 50° to 70°, voidage ranging from 0.2595 to 0.4764, layer spacing between 70% and 100%, grit sizing between 50 and 100, and a mean particle diameter ranging from 100 to 800 microns. Particles 50 may include specific gravities ranging from 1.0 to 3.0 g/cm$^3$. In some embodiments, particles 50 may include proppants, such as, for example, silica sand, glass beads, walnut shells, aluminum microspheres, aluminum oxide sand, and resin-coated and ceramic microspheres.

Particle bed 75a may fluctuate by vibration of particles 50 in particle bed 75a by introducing particles 50 to an electric field oriented to electrostatically levitate particles 50, or by other methods for maintaining particles 50 in constant fluidized motion. Persons of ordinary skill in the art would appreciate that gravity may be replaced by a magnetic or electrostatic field created by an external permanent magnet, and the solid phase may be composed of magnetic microbeads with diameters ranging from 100 to 300 microns. Particles levitated by a magnetic field may achieve low driving pressures (e.g., less than 0.5 psi) with liquid/solid contact and a continuous recirculation of particles for target capture efficiencies. In some embodiments, a particulate material may include magnets distributed with particles 50, and the magnets may have an average individual size between 2 and 10 times that of the nonmagnet particles 50. The particulate material may be subjected to an upward flow of gas and to a magnetic field varying with time, direction, and intensity to produce and control the resulting fluidized bed. The varying magnetic field may be concentrated in localized regions of the bed. Surface control may be achieved by providing a horizontal varying magnetic field at the surface of the bed. Persons of ordinary skill in the art would appreciate that fluidization may be achieved without the gas flow and/or without any non-magnetic particles. In some embodiments, a non-electrically conductive mold may be used in concert with magnetic particles, such as, for example, aluminum, ceramic, concrete, glass, and carbon. The fluidized bed of the present disclosure may provide a stable and homogeneous particle circulation and may be free of large bubbles, slugs, channeling, spouting, or the like.

In some embodiments, an exhaust air 71 may be collected, pressurized, and subsequently recirculated back (not shown)

into base plenum 76 via inlet pipe 78. Exhaust air 71 may also be expelled to the ambient environment or to the atmosphere.

A lifting mechanism 59 may be coupled to frame 12. Lifting mechanism 59 may lower or raise frame 12 into fluidized bed particles 50 depending on the thermal cycling characteristics of mold 40. In one embodiment, thermal insulation 55 may be disposed between inner wall 56 and outer wall 58.

Figure 3:
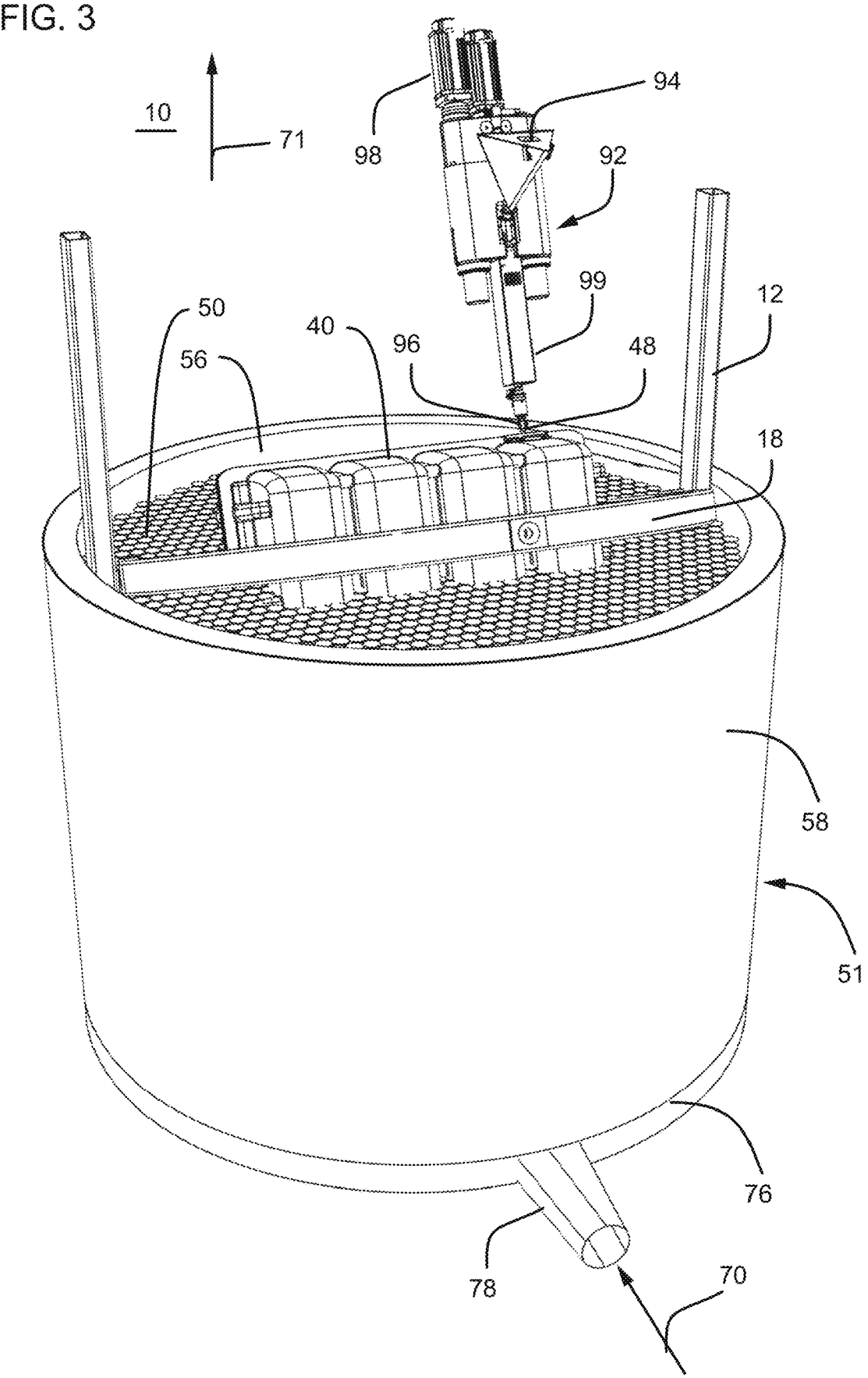
FIG. 3 illustrates a perspective view of an exemplary rotational molding device with a device for non-pressurized injection of thermoplastic material into the interstitial space of a mold, according to an exemplary disclosed embodiment.

FIG. 3 illustrates a perspective view of rotational molding device 10 with a device for non-pressurized injection of thermoplastic material into the interstitial space of mold 40, according to a disclosed embodiment. In accordance with an exemplary embodiment, rotational molding device 10 may comprise a thermoplastic injection unit 92, vessel 51, and mold 40 attached to frame 12. Thermoplastic injection unit 92 may be used in conjunction with suitable rotational molding heating methodologies, including, for example, various convection-based ovens, electric heating elements directly embedded into mold 40, oil heated molds, and various other methods for heating of a mold. Thermoplastic material preferably may be added to a hopper 94 of injection unit 92 in various forms, including, but not limited to, powder, pellets, micro beads, and others suitable forms. An extruder motor may spin a heated feeder screw 99 configured to deposit molten thermoplastic material out of an extruder nozzle and through a pressure vent aperture 48 into mold 40. In some embodiments, molten thermoplastic may be injected at approximately standard atmospheric pressure. Mold 40 is preferably preheated before the liquid polymer material is introduced, which may thereby speed up the forming process by reducing sintering time. After the desired shot of thermoplastic material is delivered to mold 40, injection unit 92 may be withdrawn from mold 40 and vent aperture 48 may be sealed. Mold 40 may be biaxially rotated until thermoplastic part is fully formed and subsequently cooled using the disclosed techniques. A thermoplastic part may be formed over a predetermined period of heating time. In other embodiments, the determination when the thermoplastic part is fully-formed fully may be measured directly using internal part thermocouple sensors.

Injection unit 92 may comprise any suitable injection device, including, for example, the E-Multi machine manufactured by Milacron or Euromap 680 by Inpros. In some embodiments, injection unit 92 may be configured to deliver shots of heated thermoplastic with little to no additional pressurization into mold cavity 40. The heating of thermoplastic material within feeder screw 99 may primarily be the result of high-frequency frictional rotational movement and secondarily electric resistance heaters built around feeder screw 99. In some embodiments, a twin-screw extruder configured to provide faster injection rates and faster recharge cycle times than a single-screw extruder of comparable volume may be used. Additionally, and/or alternatively, extruder 92 may be equipped with a shut-off valve, which may facilitate the extruder stopping and starting injection promptly once the desired shot weight of thermoplastic is delivered into the interstitial cavity of mold 40.

Embodiments of the present disclosure contemplate the use of any appropriate thermoplastic resin for the desired end product. Examples include, but are not limited to, polyolefins, polyamides, polyesters, styrenics, and higher performance plastics such as polycarbonate, PEEK, PEKK, and Ultem. A slip additive may be used to reduce the viscosity of extruded thermoplastic. Embodiments of the present disclosure also contemplate using other plastic modifiers that may allow the thermoplastic to flow at elevated temperatures. Bulk viscosity and melt index may be adjusted independently to develop suitable materials for this rotational molding technique. Thermoplastics may be dried before placement into hopper 94, which may reduce any remaining moisture and reduce unwanted inclusions or reduce entrapped air.

Figure 4:
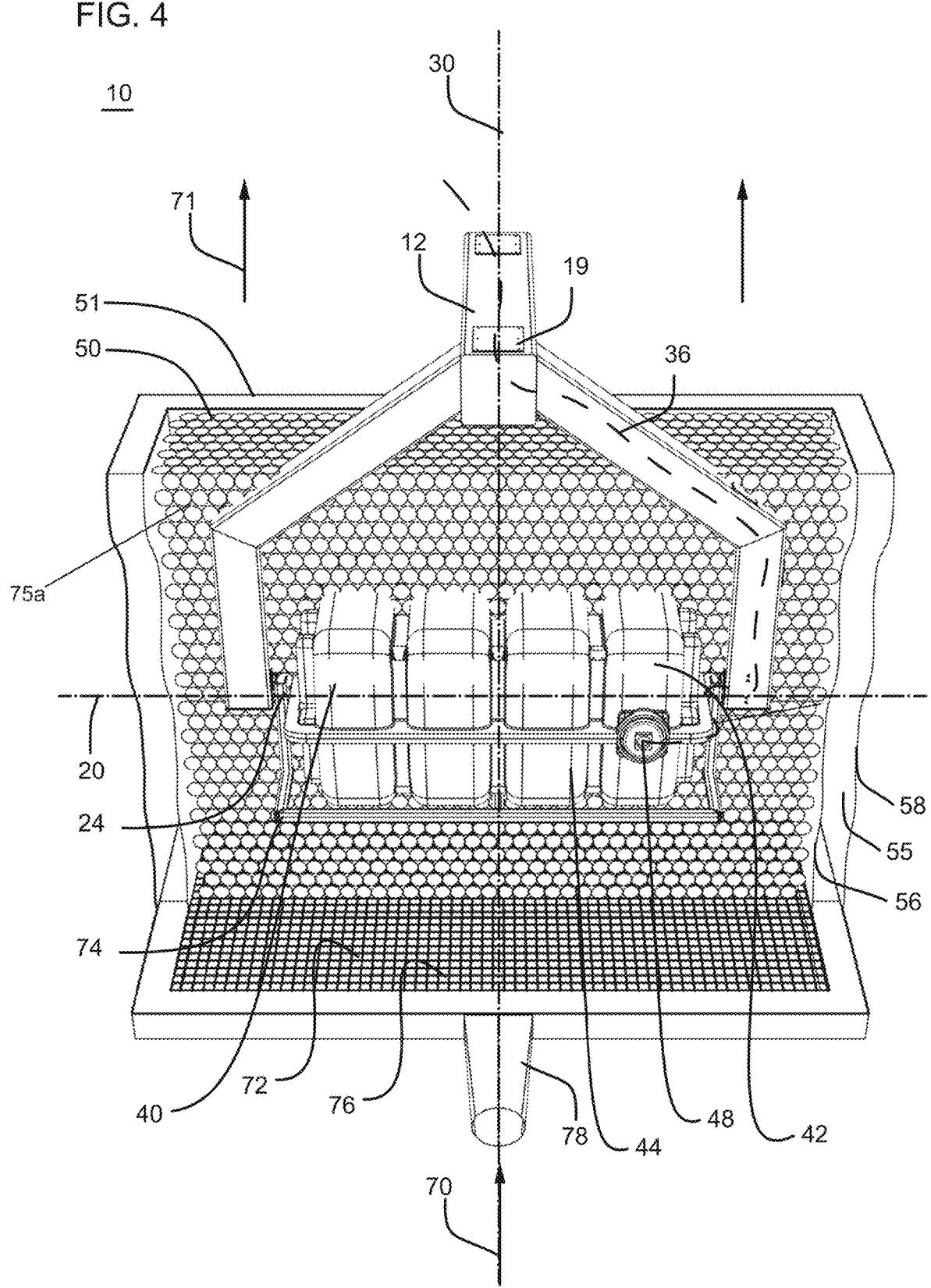
FIG. 4 illustrates a cross-sectional perspective view of an exemplary "rock-and-roll" style fluidized bed rotational molding device facilitating 360° continuous rotation about one axis and partial rotation about a second axis, according to an exemplary disclosed embodiment.
Figure 5:
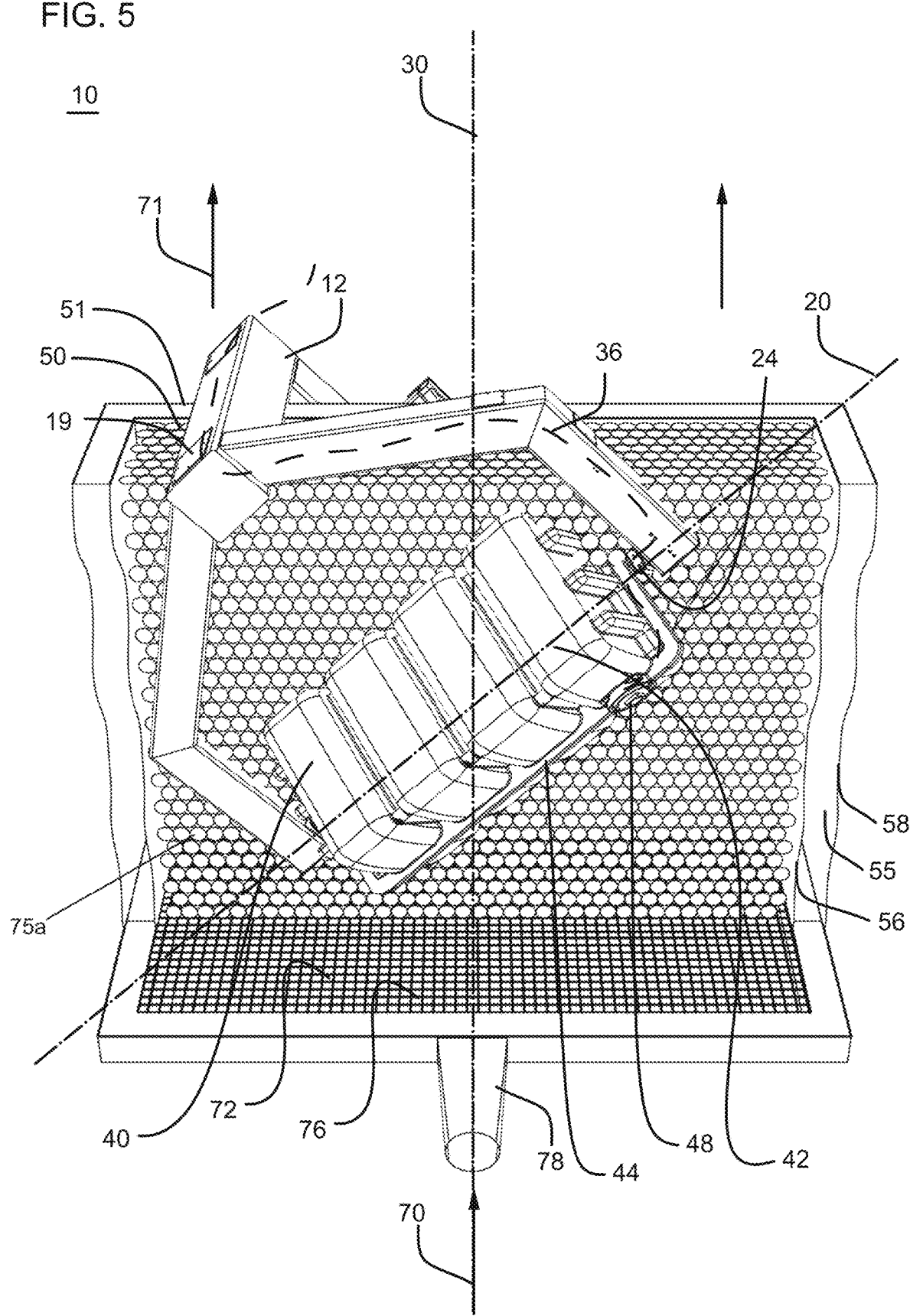
FIG. 5 illustrates another cross-sectional perspective view of the exemplary rock-and-roll style fluidized bed rotational molding device of FIG. 4, according to an exemplary disclosed embodiment.
Figure 6:
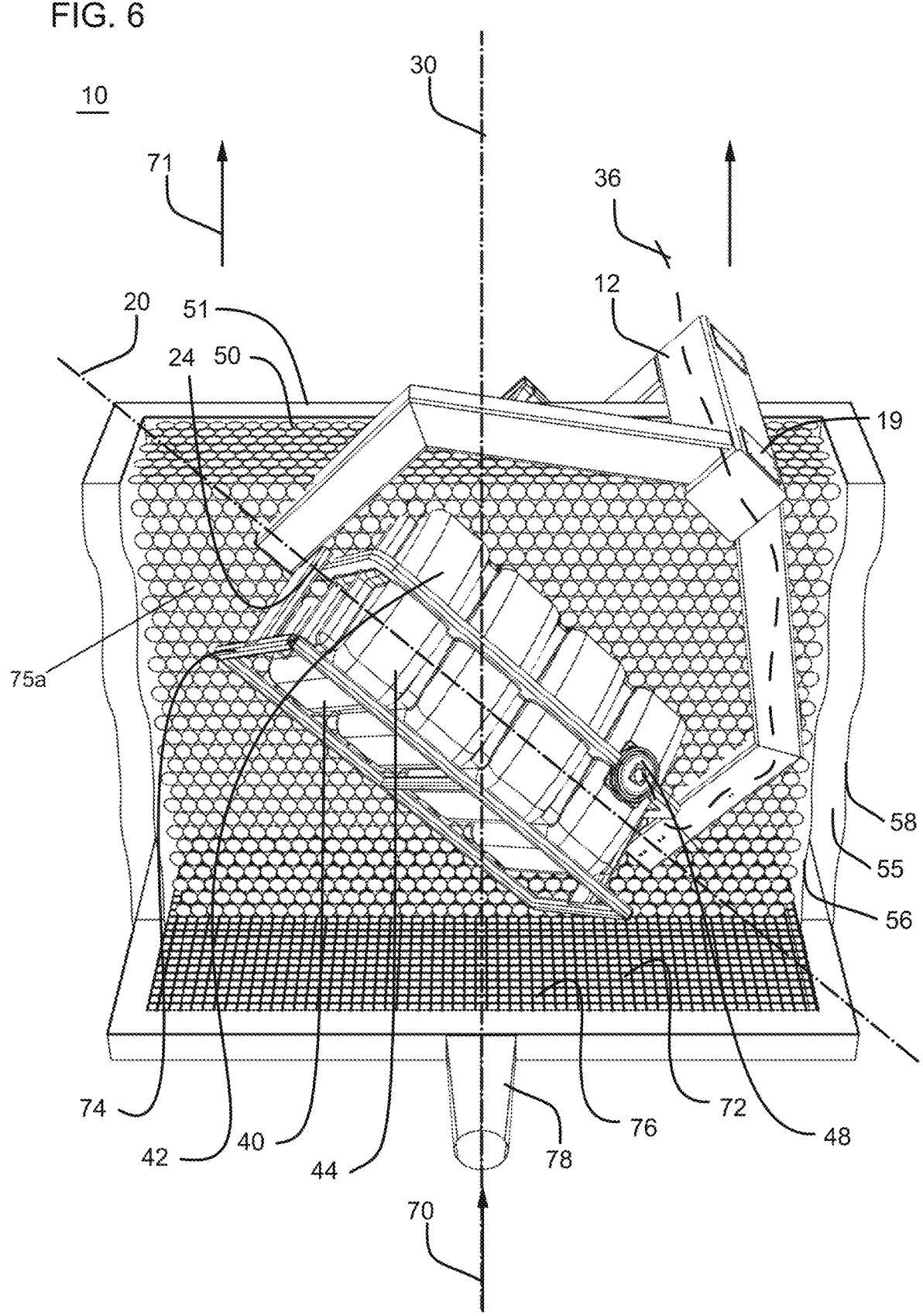
FIG. 6 illustrates another cross-sectional perspective view of the exemplary rock-and-roll style fluidized bed rotational molding device of FIG. 4, according to an exemplary disclosed embodiment.

FIGS. 4-6 illustrate cross sectional views of an exemplary "rock-and-roll" molding device 10. Rock-and-roll molding device 10 may comprise a rotating mold 40 and heated or cooled fluidized bed vessel 51. Heated or cooled fluidized bed vessel 51 may be configured to produce long narrow parts 46 (shown in FIG. 8). Preferably, rock-and-roll molding device 10 may be configured to keep most power mechanisms out of the fluidized environment. Rock-and-roll molding device 10 may comprise frame 12 configured for movement along first axis 20 and second axis 30 orthogonal to first axis 20. Movement along first axis 20 and second axis 30 may be powered by first power source 22 and second power source 32, respectively. Rock-and-roll molding device 10 may comprise an access panel 19 configured to provide access to mechanical power linkages linking first power source 22 and second power source 32 to first axis 20 and second axis 30, respectively. In some embodiments, one or more first axis rotating joints 24 disposed on one or both ends of frame 12 may be configured to facilitate 360°, continuous "roll" about first axis 20. Additionally, and/or alternatively, second axis rotating joints 34, substantially disposed outside of vessel 51, may be configured to facilitate a 0° to 90° "rock" about second axis 30. Mold 40 may be disposed on first axis rotating joints 24 by mold offset base 74. Mold 40 may further comprise two or more mold portions of mold base 44 and removable mold lid 42.

A pressure vent tube 36 may provide internal control of pressure or may introduce internal conditioning via fluidized particles 50, Lifting may be facilitated by a powered vertical track 64, whereby frame 12 may be independently lowered into or raised from the bed of fluidized particles 50, depending on the thermal cycling characteristics of mold 40. In some embodiments, thermal insulation 55 may be disposed between inner wall 56 and outer wall 58.

Mold 40 conditioning, via particle interactions, may provide uniform heating and distribution of thermoplastic material inside mold 40. In some embodiments, conditioning mold 40 prior to addition of thermoplastic material may decrease raw material shot weight consumption by 15% to 30%, depending on the geometry. Thermoplastic shot weight may be determined by the thinnest areas for a given part using convection ovens. The same temperature may be obtained at each point of the inner surface of mold 40 even in the case of double walls or undercuts. Prior known rotational molding technologies may result in thin-walled portions of the finished article because of uneven distribution of thermal energy via convective heating. In accordance with embodiments of the present disclosure, improved control and repeatability of the fluidized bed environment may be advantageous for the formation of thermoplastic parts. This may reduce waste caused by process variables, some of which may be difficult to keep under control in conventional molding methods. Embodiments of the present disclosure provide uniform and rapid thermodynamic energy transfer within a fluidized bed. This advantageously supports making complex geometric shapes and technical components, such as those in the automotive and aerospace industries. Waste may be reduced to zero, compared to typical rejection rates of 10% or more for rotational molding of parts.

Embodiments of the present disclosure may also reduce energy consumption. The efficient cooling of the mold achieved by the fluidized bed system may yield thick-walled parts that are distortion free. Rapid, distortion-free cooling may be aided by cooling inside the mold with air, water, or fluidized particles, or any combination thereof. Fast-heating of the inside of the mold, with possible temperatures of the inside of the mold exceeding 1,000° F., may facilitate molding a new generation materials and engineered plastics that may be difficult to mold using conventional methods and equipment. Pressure and/or vacuum molding may ensure the moldability of materials, such as polyamides (PA6 powder and liquid, PA6.6, PA11, PA12), PC and PLA. In addition, quenching mold 40 in uniform temperatures may reduce the risk of shape changes in the molded part.

Figure 7:
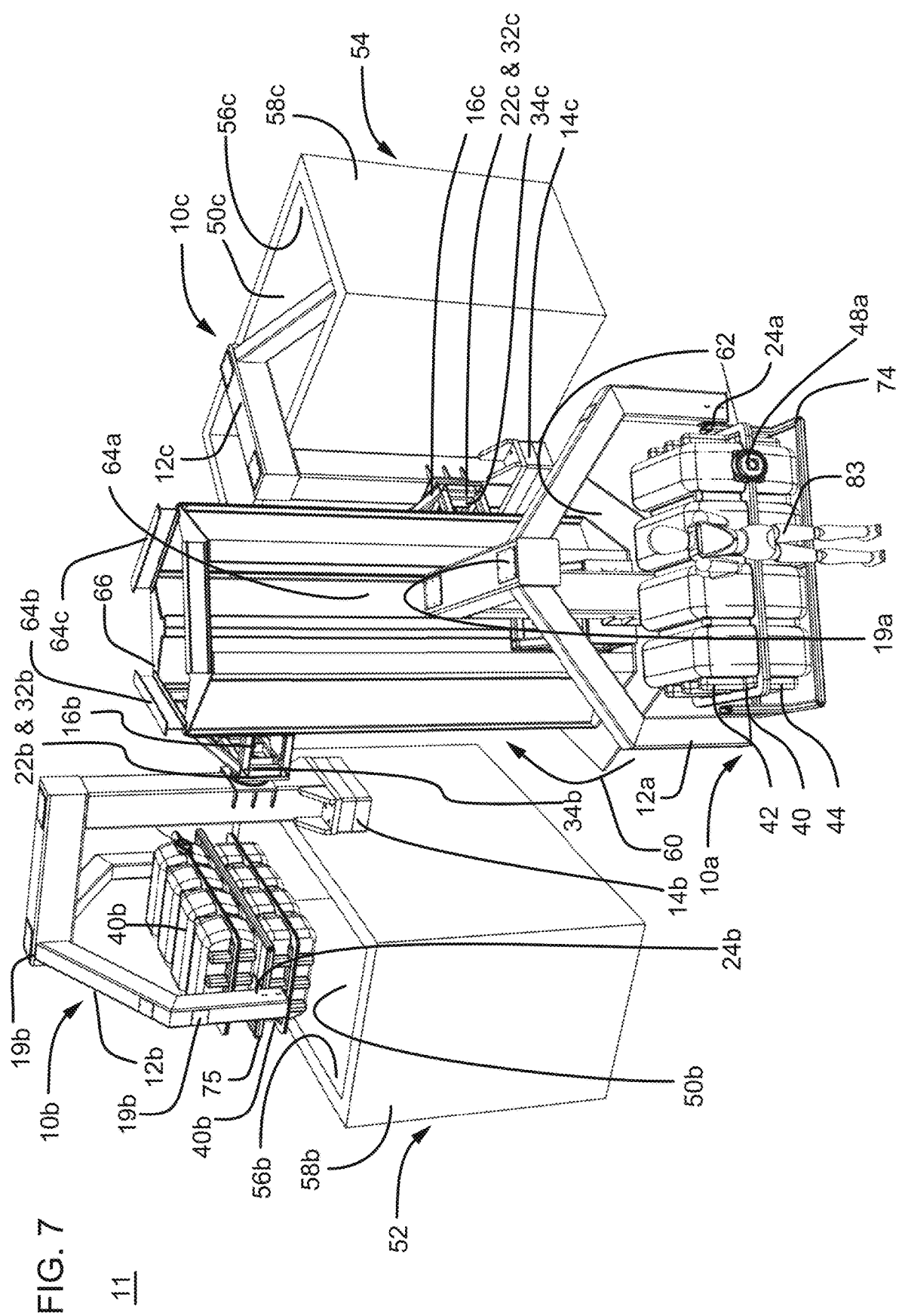
FIG. 7 illustrates a perspective view of an exemplary carousel-style fluidized bed rotational molding device configured to facilitate heating, cooling, loading, and unloading, according to an exemplary disclosed embodiment.

FIG. 7 illustrates a perspective view of an exemplary carousel-style fluidized bed rotational molding machine 11 configured to facilitate heating and cooling, loading and unloading, in accordance with disclosed embodiments. Mold 40 may be loaded and thereafter indexed through a heating and curing station while additional molds are loaded while an additional mold is loaded. Machine 11 may comprise a central column 66 adjoining a third axis 60 and may be fastened to baseplate 62. The central column 66 may carry a plurality of molding arm devices 10a-10c at fixed 120° angles with respect to each other. In some embodiments, central column 66 may carry a plurality of molding arm devices 10a-10c at fixed angles between 60° and 180° with respect to each other, for example 60°, 72°, 90°, or 180°. Any number of molding arm devices 10a-10c may be attached to central column 66. A lifting mechanism may be facilitated by a powered vertical track 64, whereby frame 12 may be independently lowered into or raised from fluidized particles 50, depending on the thermal cycling characteristics of mold 40. Drive mechanisms 22a-22c may be mechanically linked to first roll axis facilitating 360° rotation within the fluidized bed. Drive mechanisms 32a-32c may be mechanically linked to second roll axis facilitating rock rotation between 0° and 90°. In some embodiments, the rocking action may be turned off during rotational molding. First and second axis may be orthogonal to each other. Mold 40 may comprise removable lid 42 and mold base 44. Furthermore, mold base 44 may be connected to an offset mold base 74.

In some embodiments, mold 40 may pass from a workstation, wherein an operator 83 may oversee removal of mold lid 42, removal of part 46, closing of mold 40, and loading of thermoplastic powder 82 at a heating station. During indexing and heating, mold 40 may be rotated about two axes substantially normal to one another. Heated fluidized vessel 52 may comprise outer wall 58b and inner wall 56b. Molds 40b attached to mold base 75 may be lowered by cantilevered frame 12b into fluidized bed 50b. Fluidized bed 50b may be continuously and thermally heated. For example, fluidized bed particles 50 may be continuously and thermally heated to 500° F. via inner wall 56b or heat elements placed within vessel 52. A first axis power source 22b may transmit 360° roll motion to first axis 24b while molds 40b are submerged into fluidized bed 50b. A second axis power source 32b may transmit rock motion to a second axis orthogonal to the first axis 24b. First and second power sources 22b and 32b may be contained within a frame pivot structure 16b. In some embodiments, frame counterweight 14 may offset the cantilevered load from structure 12b and mold 40b, thereby reducing load on the second axis 32b.

In some embodiments, mold 40 may pass from a heating station, wherein a thermal plastic part has fully sintered, to a cooling station. Cooled fluidized bed vessel 54 may comprise outer wall 58c and inner wall 56c. Molds 40c attached to mold base 75c may be lowered by cantilevered frame 12c into cooled fluidized bed 50b. Fluidized bed 50c may be continuously and thermally cooled, for example, to 100° F. via chilled water pipes (not shown) on inner wall 56c and/or convectively cooled by pressurized fluidizing air 70. A third axis power source 22c may transmit 360° roll motion to a third axis 24c while molds 40c are submerged in fluidized bed 50c. A fourth axis power source 32c may transmit rock motion to a fourth axis orthogonal to the third axis. Third and fourth power sources 22c and 32c may be contained within frame pivot structure 16c. In some embodiments, frame counterweight 14c may offset the cantilevered load from structure 12c and mold 40c, which may further reduce loading on second axis 32c.

A heating station, a cooling station, and a loading/unloading station may be provided. Conventional fixed arm carousel machines may be disadvantageous because, for a given part, processing time may be different at each station. This may prevent using three or four positions simultaneously, thereby allowing the use of only one position and reducing overall productivity of the machine. Embodiments of the present disclosure may provide a fixed-arm rotational molding machine that does not have the disadvantages of conventional machines. By way of example, vertical track 64a, 64b, and 64c may provide independent control of the amount of time a mold is submerged in the heated fluidized bed or cooled fluidized bed. Other styles of machines may be utilized in the practice of the embodiments of the present disclosure including, but not limited to, shuttle-type machines, clamshell mold machines, swing arm machines, and up/over machines.

A problem with conventional carousel machines may be speed and related payback cost. The physical size of convective based ovens and coolers may require substantial factory space. An additional problem with conventional rotational molding machines may be the short life span of bearings, which support the mold carrying arms. In conventional machines, when a mold is rotated about two normal axes and heated, the bearings may be directly exposed to high temperatures inside the oven chamber or heating station. Convective ovens may be inefficient at transferring thermal energy due to boundary layer effects and may use differences in air temperatures and desired mold temperatures to compensate.

Conventional convective ovens may be required to operate at temperatures between 550° F. and 1,000° F., whereas the fluidized bed vessels of the embodiments of the present disclosure may operate at 400° F. to 500° F., to achieve the desired mold temperature. For example, in some embodiments, a 500° F. fluidized bed may bring a mold up to 450° F. in less than four (4) minutes, whereas a conventional 650° F. convective oven may require twenty (20) minutes to reach 450° F. Fluidized beds of the present disclosure may operate with low temperature differences when compared to conventional convective heating. Reducing the high temperatures seen by bearings and bolts in conventional oven designs may increase component lifecycle. Higher thermal temperatures may also work-harden certain metals and induce brittleness.

Another problem with conventional rotational molding machines may be the difficulties with mold loading, mounting, and removal. For example, in conventional rotational molding machines, a mold must be loaded with plastic material and then mounted on a turret arm. Where a plurality of turret arms may be implemented, loading, mounting, and removal of molds may be particularly time-consuming and inefficient.

Figure 8:
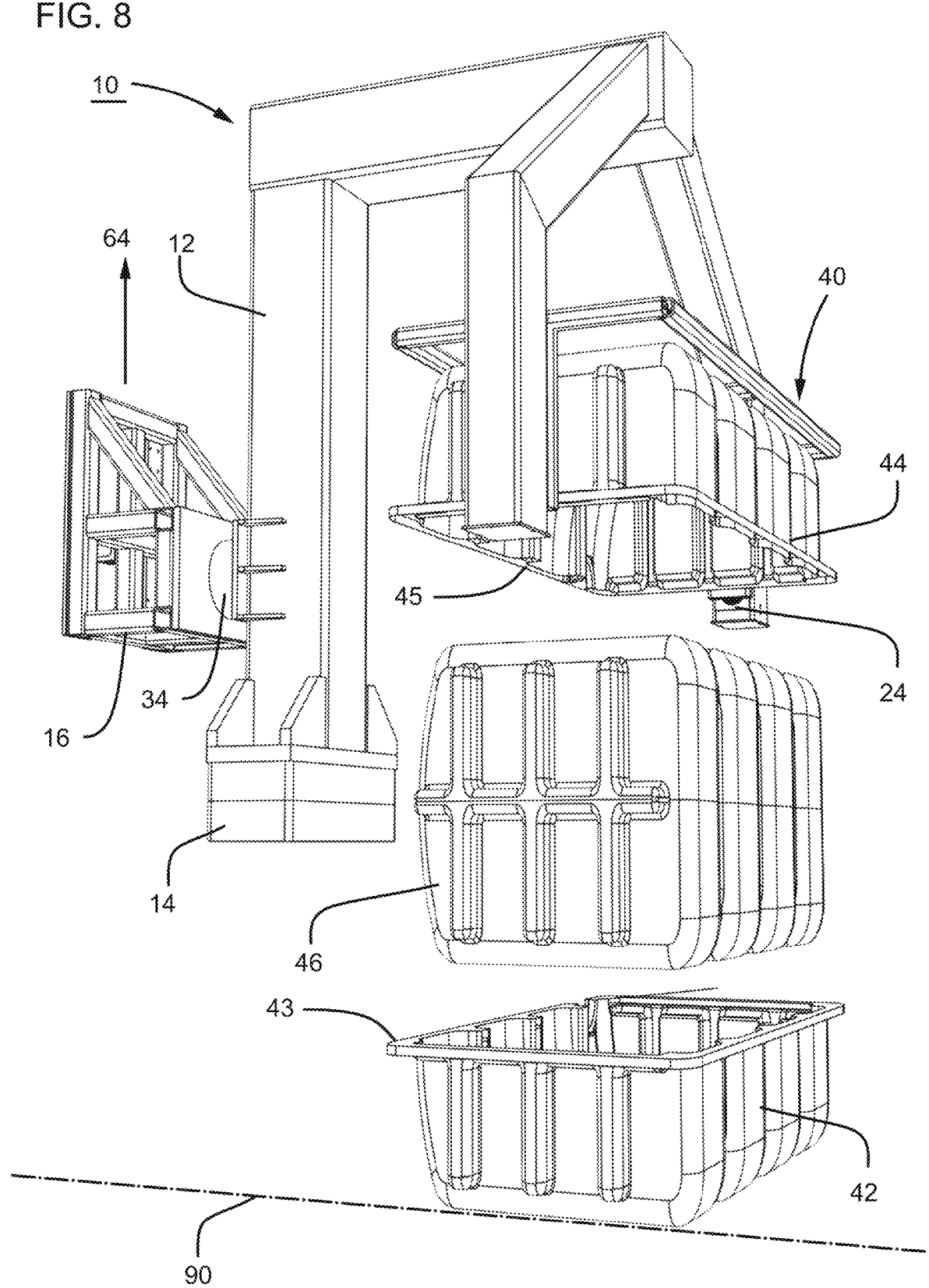
FIG. 8 illustrates a perspective view of an exemplary opening and closing of a mold configured to be used on a fluidized bed rotational molding device, according to an exemplary disclosed embodiment.

FIG. 8 illustrates a perspective view of the opening and closing of a mold 40 used on a fluidized bed rotational molding device 10, according to an exemplary disclosed embodiment. In some embodiments, vertical track 64 utilized to lower and raise mold 40 into and out of the fluidized bed 50 may also be utilized to facilitate mold opening and closing. In some embodiments, first axis power source 22 may rotate roll bearings 24 with mold lid 42 facing the ground 90. Fastening devices (not shown) may be configured to hold mold lid lip seal 43 to mold base lip seal 45. Upon release of the fastening devices, vertical track 64 may raise frame 12. Mold lid 42 may be left on the ground 90 or on another suitable surface. Mold base 44 may be lifted vertically upward, thereby allowing completed thermoplastic part 46 to be automatically removed via gravity. Frame counterweight may aid in maintaining stability of frame 12 throughout the process. Persons of ordinary skill in the art would appreciate that the process may be reversed to close the top and bottom lids. The speed of the operation may be based on the sintering and curing time and not by the loading of the plastic materials into the molds or quenching of the molds.

Figure 9:
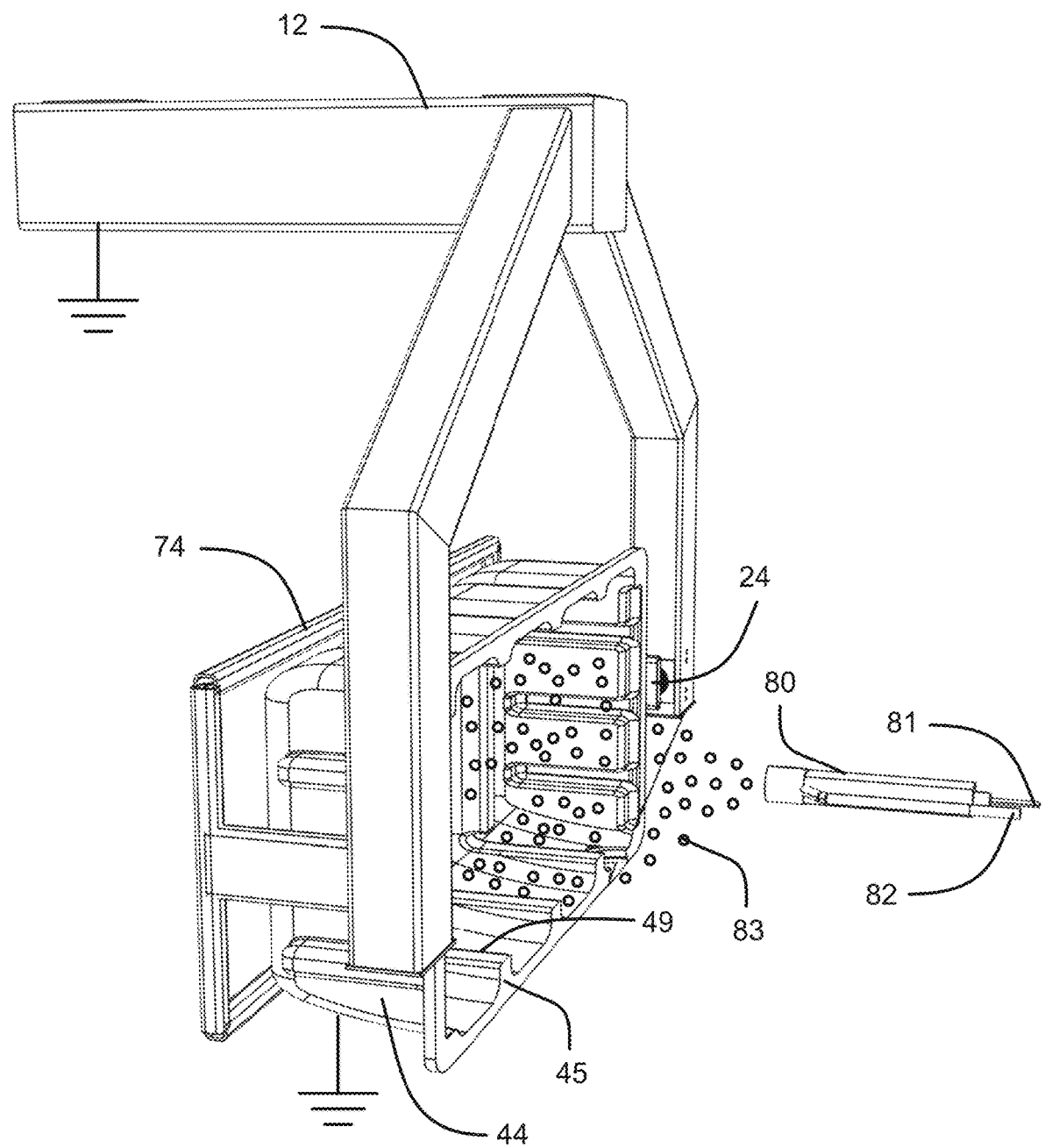
FIG. 9 illustrates a perspective view of an exemplary process for introducing thermoplastic inside of a mold via electrostatically-charged thermoplastic powder, according to an exemplary disclosed embodiment.

FIG. 9 illustrates a perspective view of an exemplary embodiment for uniformly introducing thermoplastic to the inside of a mold via electrostatically charged thermoplastic powder. An electrostatic coating apparatus 80 may be positioned proximate to an opened mold, such as mold 40 in FIG. 8. For example, electrostatic coating apparatus 80 may be positioned proximate to mold base 44 or mold lid 42 (shown in FIG. 8). First axis rotating joint 24 may provide a suitable angle, given specific mold 40 geometry and with respect to the normal direction of coating apparatus 80. Coating apparatus 80 may be configured to spray thermoplastic powder (e.g., polyethylene or polypropylene) in powdered form onto mold base inside surface 49. Coating apparatus 80 may be connected to a source of powdered thermoplastic particles 82 and sprayed by any appropriate means, including, for example, compressed air.

Coating apparatus 80 may impart a positive charge onto thermoplastic particles 82 as thermoplastic particles 82 are sprayed onto the inside surfaces of mold 40. Each of mold base 44, mold lid 42 (shown in FIG. 8), offset mold base frame 74, and superstructure frame 12 may be electrostatically grounded. As such, powdered thermoplastic particles 82 may be electrostatically coated onto interior mold surfaces of mold 40.

Depending upon the characteristics of the desired final part 46, a wide variety of thermoplastic material in powder form 82 may become electrostatically charged thermoplastic powder 83. For example, the thermoplastic powder material may include, but not limited to, polyethylene (e.g., LDPE, LLDPE, MDPE, HDPE, XLPE, mLLDPE, EVA, EBA, etc.), polypropylene, polyvinyl chloride, polyesters, nylon, polycarbonate, ABS, fluoropolymers, polystyrene, and polyurethane. In some embodiments, the powder material may include metallic and/or ceramic materials.

Persons of ordinary skill in the art would appreciate that coating apparatus 80 may be configured to control the rate at which charged thermoplastic particles 83 are sprayed and may be configured to control the electrical charge rate of powdered thermoplastic particles as they exit the coating apparatus 80 via an electrical power source 81. Coating apparatus 80 may comprise any suitable device for use in electrostatic coating. For example, in some embodiments, coating apparatus 80 may comprise powder coating spray guns. A high degree of uniformity may be achieved as exacting layer thickness may adhere to mold 40 inside surfaces. This uniformity may be achieved because the high electrical potential between charged thermoplastic particles 83 and inside surfaces of mold 40 may diminish exponentially after a certain thickness. An electrostatic cloud of sprayed thermoplastic particles 83 may create nearly complete coverage of these multiple layers of microporous particles, which may thereby eliminate defects relating to even particle sintering. In some embodiments, only a single monolayer of thermoplastic particles may aid in the formation of a part during biaxial rotation. Persons of ordinary skill in the art would appreciate that in the embodiments of the present disclosure, the loading of thermoplastic particles to inside surfaces of mold 40 may be 1/16" thick to 1/8" thick, or more.

In some embodiments, inside areas of mold 40, such as for example, mold base lip seal 45, may be masked off to inhibit buildup of thermoplastic particles 83. Mold 40 may comprise hard, anti-stick material and may be heated to a suitable temperature. In some embodiments, mold 40 may be formed of aluminum or hardened steel to increase thermal mass. Persons of ordinary skill in the art would appreciate that mold 40 may be Teflon- or diamond-coated to provide longevity, high cycle repeatability, and ease of part removal without distortion. Mold 40 may be preheated to further amplify the electrical charge potential and thereby create thicker layers of thermal plastic material. In some embodiments, the layers may be up to 1/4-inch thick.

Coating apparatus 80 may be arranged relative to interior contours of mold base 44 to regulate the coating properties of thermoplastic particles 83 onto an interior of mold 40. Angling the position of apparatus 80 relative to mold 40 may improve the uniformity of powdered thermoplastic powder. Uneven distribution and splotching of thermoplastic particles 83 may be caused by horizontal positioning of apparatus 80. It may be avoided by adjusting: the proximity relative to the mold 40; the rate at which thermoplastic particles 83 are sprayed and/or the electrical charge rate of thermoplastic particles 83 as thermoplastic particles 83 exit coating apparatus 80.

Coating apparatus 80 may be held by an operator or may be attached onto the end of a robot. The proximity of coating apparatus 80 relative to mold 40 may also affect the density and distribution of thermoplastic particles 83 spray coated onto inside surfaces of mold 40. In some embodiments, coating apparatus 80 may be positioned three (3) to twelve (12) inches from mold 40. In some embodiments, a plurality of coating apparatuses 80 may be implemented and may operate in unison. Positioning coating apparatus 80 closer to mold 40 may focus a spray profile of thermoplastic powder and concentrate the thickness of thermoplastic particles 83 on surfaces. Positioning coating apparatus 80 further away from mold 40 may expand a spray profile of powered particles and coat more of the inside surface area of mold 40 with a single pass. The expanded spray profile may also increase the number of powered particles that may pass and not be electrostatically picked up by mold inner surfaces.

A single monolayer of thermoplastic particles coating the inside of mold 40 with greater than 99% coverage may be achieved, thereby eliminating the need for surface enhancers and may increase quality by providing a "tacky" surface onto which further thermoplastic particles 83 may readily attach. Furthermore, this may reduce the sintering cycle times, thereby resulting in less degradation of the plastic.

FIG. 10 illustrates a cross-sectional perspective view an exemplary external and internal fluidized bed rotational molding device 10, according to an exemplary disclosed embodiment. Rotational molding device 10 may comprise an internal fluidized particle conditioning system including a first aperture 47 and a second aperture 48. A control system (not shown) may be in operable communication with an exiting conditioned fluidized bed particle 36. The control system may operate the internal fluidized bed particle heating and/or cooling system to keep the temperature of the inside surface of mold 40 substantially the same as the temperature of an outside surface of the part. This may be monitored by first thermocouple 85 and a second thermocouple 86 (as seen in FIG. 11a-11h). The control system may operate the internal fluidized particle cooling system to allow the circulating fluidized bed particles to extract thermal energy from the inside surface of a part. The rate may be substantially equal to that of the thermal conduction gain between the outside surface of the part and hot inside surface of mold 40, based on the measured temperatures of first 85 thermocouple and second thermocouple 86. With energy being extracted substantially equally from the inside and outside of mold 40, the resultant crystallized thermoplastic part may experience little to no induced thermal stresses.

The embodiments of the present disclosure may be used to mold anything that will set under heat, including, but not limited to, thermoplastics, plastisols, or polyethylene type materials. The embodiments of the present disclosure may also be used to mold common molding resins, such as epoxies, acrylics, or polyesters, where catalysts may be used instead of heat.

FIGS. 11a-11g illustrate cross sectional views of an internally conditioned rotational molding device 13 according to the embodiments of the present disclosure. The internally conditioned rotational molding device 13 may comprise a mold 40 for molding a part 46. Mold 40 may comprise a cavity corresponding to a shape of the part 46. Mold 40 may comprise an internal heating or cooling system that may comprise one or more apertures 37 configured to selectively introduce fluidized particles 50 into the cavity, or selectively allow fluidized particles to flow out of the cavity. The internally conditioned rotational molding device 13 may also comprise an exhaust air port 69. Exhaust air port 69 may be configured to selectively open to allow fluidizing air flow 70 out of the cavity when the first aperture 37 is configured to introduce and release fluidized particles from a particle source of sufficient quantity into the cavity. The internally conditioned rotational molding device 13 may further comprise a single dual-flow aperture 37 that may be configured to provide both a supply of circulating fluidized particles into the cavity. It may also provide a passage for circulating fluidized particles out of the cavity. The dual-flow aperture 37 may be used with a series of valves to control the number of fluidized particles flowing into and out of the cavity.

The internally conditioned rotational molding device 13 may comprise biaxially rotating mold 40, heated fluidized bed vessel 52, cooled fluidized bed vessel 54, and fluidized bed vessel 79 containing thermoplastic material 82. The internally conditioned rotational molding device 13 may further comprise frame 12 with a mechanism for movement along first axis 20 and second axis 30 positioned orthogonal to the first axis 20. First axis 20 and second axis 30 may be rotationally supported and powered by a first powered bearing 34 and a second powered bearing 24, respectively. In some embodiments, powered bearing 34 may facilitate 360°, continuous rotation about first axis 20. Additionally, second powered bearing 24 may facilitate 360°, continuous rotation about second axis 30. Mold 40 may be joined by a single point to first and second powered bearings 34 and 24.

Mold 40 may further comprise mold base 44 and removable mold lid 42. In addition, mold 40 may comprise thermally insulating material 55 and inside surface 49. One or more particle apertures 37 may be configured to facilitate fluidized particle transport entering and exiting mold 40 cavity. One or more exhaust air ports 69 may provide allow for fluidizing airflow 70a, 70b, or 70c to escape mold 40. In some embodiments, a mold particle filter 65 may be configured to maintain fluidized particles 50a or 50b within mold 40.

Internally conditioned rotational molding device 13 may comprise an internal fluidized bed particle heating system. The internal fluidized bed particle heating system may comprise a first aperture 37 and a first exhaust port 69. A control system may be in operable communication with the heated fluidized particle 50a supply. Heated fluidized bed vessel 52 may comprise a base plenum 76a, gas distributor 72a, vessel inner wall 56a, and vessel outer wall 58a. In some embodiments, thermal insulation 55a may be disposed between inner wall 56a and outer wall 58a. Heating elements (not shown) may be positioned throughout the interior of fluidized bed vessel 52 or attached to the inner wall 56a. Embodiments of the present disclosure contemplate the use of various mechanisms and methods of providing thermal energy to the interior of vessel 52 and may include, for example, resistance heating elements, microwave, infrared, gas firing, induction heating, direct solar heating, or any other suitable methods.

The heated fluidized bed vessel 52 may comprise fluidized particles 50a. Pressurized air flow 70a may enter fluidizing chamber 76a via inlet pipe 78a. The fluctuation of the fluidized bed may be activated by the flow of gases, by vibration of particles 50a in the bed, by introducing particles 50a to an electric field oriented to electrostatically levitate particles 50a, or by other methods for maintaining particles 50a in constant fluidized motion. In some embodiments, the flow of exhaust air 71a may be controlled by valve 41a. Furthermore, exhaust air 71a a may be collected, pressurized, and subsequently recirculated back (not shown) into base plenum 76a via inlet pipe 78a. Exhaust air 71a may also be expelled to the ambient environment or to the atmosphere. In some embodiments, a vessel particle filter 39a above the freeboard 15a may contain fluidized particles 50a within vessel 52.

Mold 40 may be fluidly connected to heated fluidized bed vessel 52 via particle feed tube 28a. In some embodiments, particle feed tube 28a may draw heated fluidized bed particles 50a from the lower portions of fluidized vessel 52 up through first and second powered bearings 34 and 24, and heated fluidized bed particles 50a may enter mold cavity 40 via particle aperture 37. The flow of heated fluidized bed particles 50a entering and exiting mold 40 cavity may be controlled by particle dispensing valve 57a and particle fill valve 53a. In some embodiments, particle feed tube 28a may be thermally insulated to maintain particle temperatures as they traverse the tube.

The internally conditioned rotational molding device 13 may comprise an internal fluidized bed cooling system comprising a first aperture 37 and a first exhaust port 69. A control system (not shown) may be in operable communication with the heated fluidized particle 50a supply. Cooled fluidized bed vessel 54 may comprise a base plenum 76b, gas distributor 72b, vessel inner wall 56b, and vessel outer wall 58b. In some embodiments, thermal insulation 55b may be disposed between inner wall 56b and outer wall 58b. Cooling elements (not shown) may be disposed throughout the interior of fluidized vessel 54 or attached to the inner wall 56a. Embodiments of the present disclosure contemplate the use of various mechanisms and methods of removing thermal energy to the interior of vessel 54 and may include, for example, chilled water pipes, DX evaporator coils, indirect evaporative cooling, direct evaporative cooling, air convective cooling, nitrogen gas, or other suitable methods.

The cooled fluidized bed vessel 54 may contain fluidized bed particles 50b. Pressurized air flow 70b may enter fluidizing chamber 76b via inlet pipe 78b. The fluctuation of the particle bed may be activated by the flow of gases, vibration of particles 50b in the bed, introducing particles 50b to an electric field oriented to electrostatically levitate particles 50b, or by other methods for maintaining particles 50b in constant fluidized motion. In some embodiments, the flow of exhaust air 71b may be controlled by valve 41b. Furthermore, exhaust air 71b may be collected, pressurized, and subsequently recirculated back (not shown) into base plenum 76b via inlet pipe 78b. Exhaust air 71b may also be expelled to the ambient environment or to the atmosphere. In some embodiments, a mold particle filter 39b above the freeboard 15b may comprise fluidized particles 50b within vessel 52.

Mold 40 may be fluidly connected to cooled fluidized vessel 54 via particle feed tube 28b. In some embodiments, particle feed tube 28b may draw cooled fluidized bed particles 50b from the lower portions of fluidized bed vessel 54 up through first and second powered bearings 34 and 24, and particles 50b may enter mold cavity 40 via particle aperture 37. Furthermore, the flow of cooled fluidized bed particles 50b entering and exiting mold 40 cavity may be controlled by particle dispensing valve 57b and particle fill valve 53b.

The internally conditioned rotational molding device 13 may comprise an internal thermoplastic injection system. The internal thermoplastic injection system may comprise first aperture 37 and first exhaust port 69, and the control system may be in operable communication with a pre-heated thermoplastic 82 supply. Fluidized vessel 79 containing thermoplastic powder 82 may comprise a base plenum 76c, gas distributor 72c, vessel inner wall 56c, and vessel outer wall 58c. In some embodiments, thermoplastic powder 82 contained within fluidized vessel 79 may be pre-heated and pre-dried to further reduce sintering times and minimize bubble formation due to moisture during the thermoplastic forming process. Heating elements (not shown) may be disposed throughout the interior of fluidized vessel 79 or attached to the inner wall 56c. Embodiments of the present disclosure contemplate the use of various mechanisms and methods of providing thermal energy to the interior of vessel 79 and may include, but not limited to, steam pipes, pre-heated compressed air, hot water pipes, direct solar heating, or other suitable methods. In some embodiments, heating element temperature may be equal to or lower than the vicat softening point of the thermoplastic to avoid agglomerating of the thermoplastic powder particles 82. Thermoplastic powder may be cryogenically ground, micronized particles, or other form recognized by persons of ordinary skill in the art.

The thermoplastic fluidized vessel 79 may contain fluidized particles 82. Pressurized air flow 70c may enter fluidizing chamber 76c via inlet pipe 78c. The fluctuation of the particle bed may be activated by the flow of gases, vibration of particles 82 in the bed, introducing particles 82 to an electric field oriented to electrostatically levitate particles 82, or by other methods for maintaining thermoplastic particles 82 in constant fluidized motion. In some embodiments, the flow of exhaust air 71c may be controlled by valve 41c. Furthermore, exhaust air 71c may be collected, pressurized, and subsequently recirculated back (not shown) into base plenum 76c via inlet pipe 78c. Exhaust air 71c may also be expelled to the ambient environment or to the atmosphere.

Mold 40 may be fluidly connected to thermoplastic fluidized vessel 82 via particle feed tube 28c. In some embodiments, particle feed tube 28c may draw thermoplastic fluidized particles 82 from the lower portions of fluidized vessel 79 up through first and second powered bearings 34 and 24, and particles 82 may enter mold cavity 40 via particle aperture 37. Furthermore, the flow of heated fluidized particles 82 entering mold 40 cavity may be controlled by particle dispensing valve 57c and particle fill valve 41c. In some embodiments, thermoplastic feed tube 28c may be thermally insulated.

The rotational molding device 13 may also comprise a first thermocouple 85 disposed within the mold 40 to measure a temperature of an outside surface of a part 46 molded in the mold 40. The rotational molding device 13 may further comprise a second thermocouple 86 disposed within the mold 40 to measure a temperature of an inside surface of a part 46 molded in the mold 40. The rotational molding device 13 may comprise a control system (not shown) in electronic communication with both the first thermocouple 85 and the second thermocouple 86.

Depending upon the characteristics of the desired final part 46, a wide variety of powder material 82 may be used. For example, the powder material may include, but not limited to, polyethylene (e.g. LDPE, LLDPE, MDPE, HDPE, XLPE, mLLDPE, EVA, EBA, etc.), polypropylene, polyvinyl chloride, polyesters, nylon, polycarbonate, ABS, fluoropolymers, polystyrene, and polyurethane. In some embodiments, the powder material may include metallic and/or ceramic materials. The powder material may be in fine grain form, pellet form, loose form, or other form compatible with rotational molding.

Figure 11A:
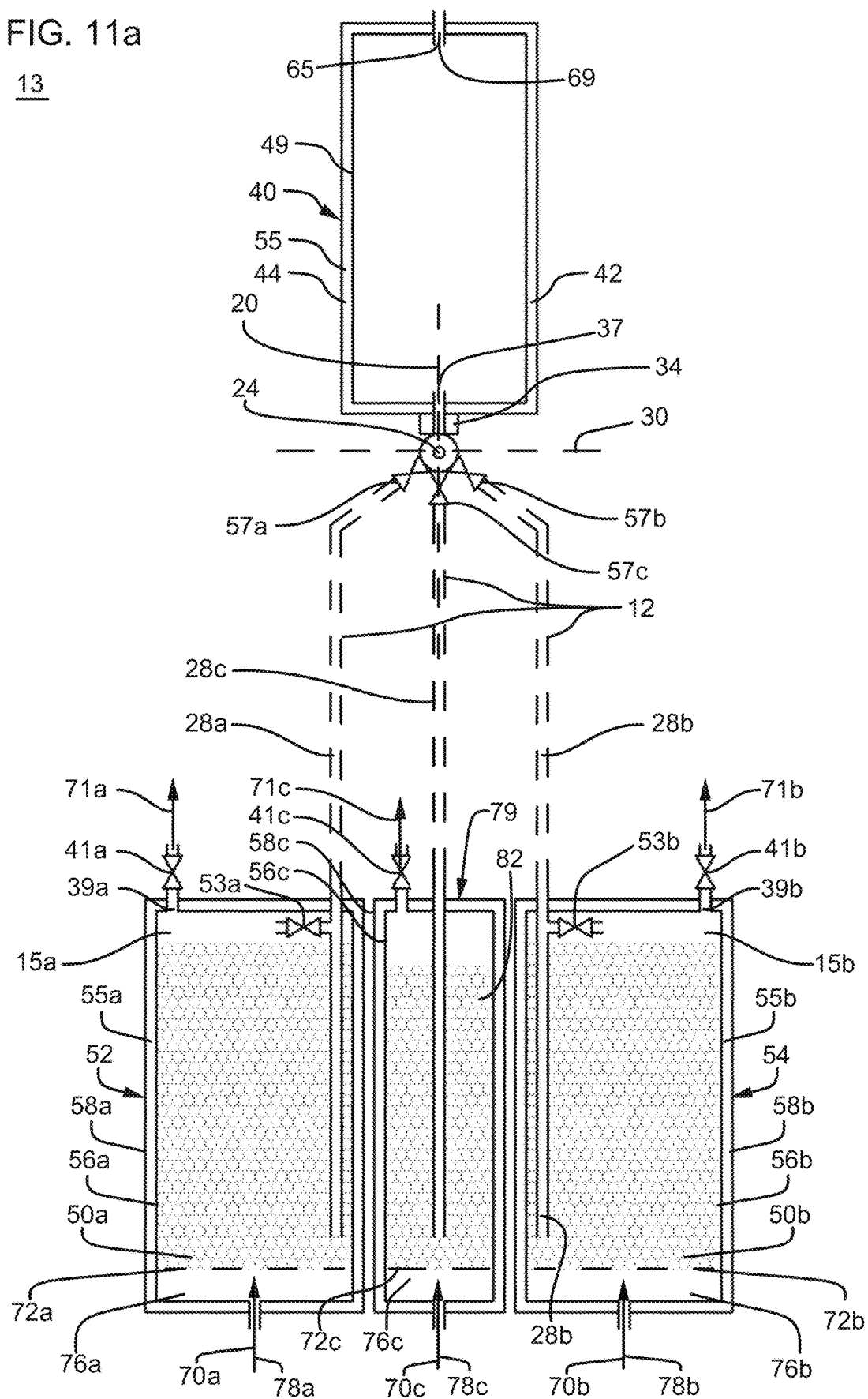
FIG. 11a illustrates a cross-sectional view of an exemplary rotational molding device internally conditioned via fluidized bed particles, according to an exemplary disclosed embodiment.
Figure 11B:
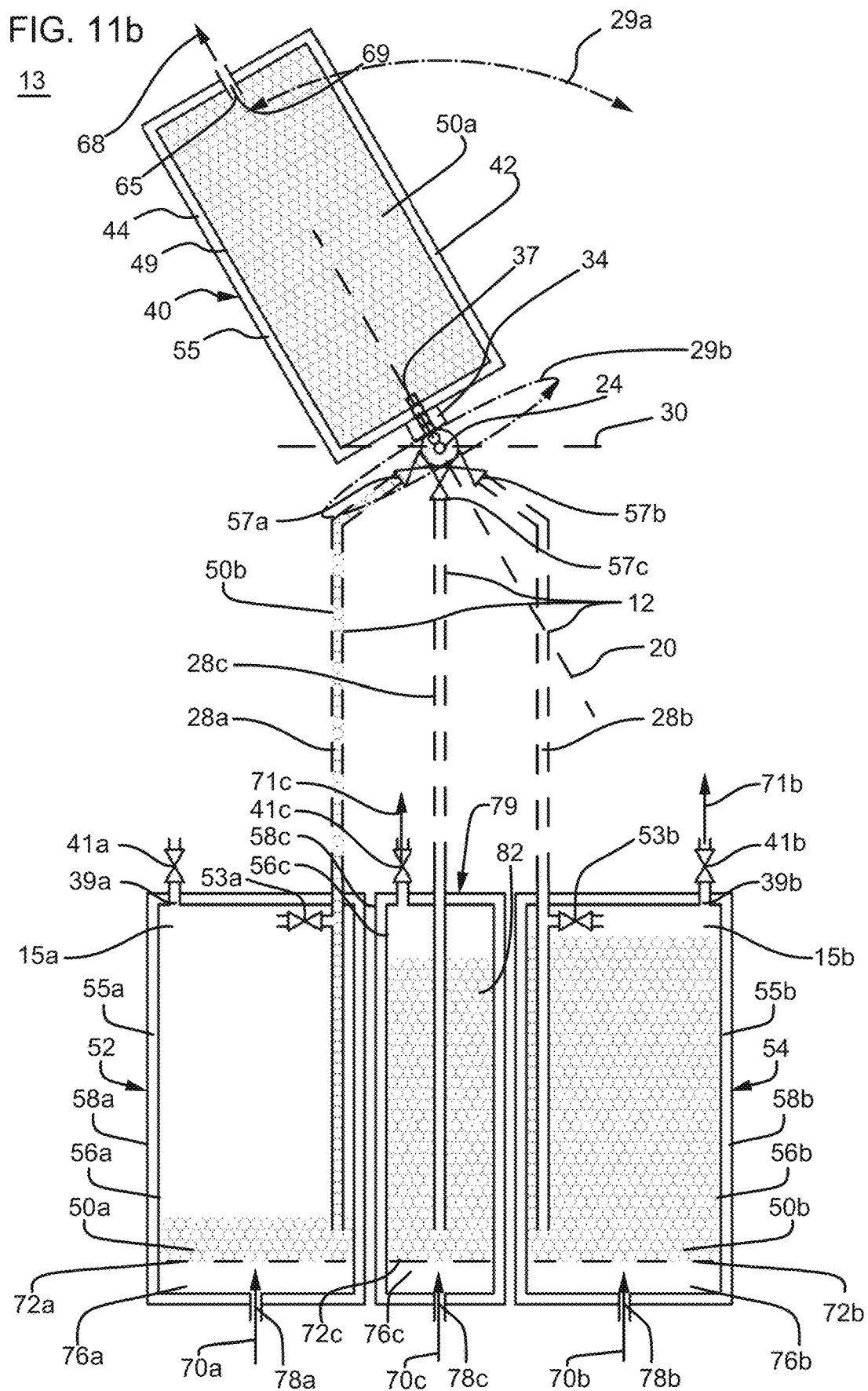
FIG. 11b illustrates a cross-sectional view of an exemplary mold internally preheated with heated fluidized bed particles, according to an exemplary disclosed embodiment.

FIG. 11b illustrates a cross sectional view of a rotational molding device 13 preheating mold 40 through internal fluidized bed conditioning. In some embodiments, valve 41a may at least partially close while valve 57a opens to allow fluidized bed bulk transport of heated particles 50a to push upwards through particle infeed tube 28a. Heated particles 50a may traverse into the mold 40 cavity through first powered bearing 24, second powered bearing 34, and aperture 37. Furthermore, pressurized air flow inlet 70a may substantially fill the interstitial space of mold 40 with fluidized bed particles 50a, while utilizing enough airflow to create a bubbling and vibration phenomena. Mold exhaust air 68 may escape out of one or more exhaust valves 69. In some embodiments, outlet particle filter 65 may maintain particles 50a within mold 40. In some embodiments, first powered bearing 24 may rotate through an arc pattern to provide constant and uniform fluidization from entering pressurized air 71 through aperture 37. The arc range may be as high as +/−90°, for example. In other embodiments, the arc range may be as high as +/−45°. The period may range from 5 seconds to 30 seconds, with faster cycle times to produce more uniform fluidizing conditions within mold 40. Additionally, and/or alternatively, second powered bearing 34 may rotate 360° to further facilitate internal mixing and fluidization.

In some embodiments, mold 40 may be selected to be manufactured out of a material with a high mass and specific heat including, for example, steel, aluminum, ceramic, stone, concrete, and other materials. It may be particularly advantageous to have an inside surface with release properties to facilitate part removal while the mold 40 is still in an elevated temperature. The external surfaces of mold 40 may be insulated to minimize thermal losses and maintain the thermal energy of mold 40 throughout the entire molding cycle. Conventional rotational moldings heat up and cool down the mold along with the finished thermoplastic part. In some embodiments of the present disclosure, fluidized rotational molding device 13 with internal conditioning may maintain an elevated temperature throughout the entire cycle. This constantly heated state may result in reduced cycle times and energy use.

Conventional rotational molding molds may be made out of thin, fragile aluminum due to this requirement for thermal cycling. Fragile aluminum molds may be reinforced with steel structures to increase the life expectancy and durability of the molds. In some embodiments, molds designed for internal fluidized bed rotational molding may be constructed of thick steel, thereby providing sufficient mass to maintain thermal energy throughout the cycle. These molds may be lower cost and may be more durable than conventional rotational mold technology.

Preheating may continue until inside surface of mold 40 monitored by first thermocouple 85 reaches a predetermined value. In some embodiments, preheating may only need to overcome a slight drop in temperature from the previous cycle, rather than bringing the mold completely up from near-ambient conditions, as is the case with conventional rotational molding practices.

Powered bearings 24 and 34 may internally support a high temperature fluid particle pathway in addition to the cantilevered loads resulting from mold 40. In some embodiments, high temperature deep groove ball bearings may be protected from the fluidized particles by either integral shields, external shields, or a combination of both. Sealing washers may be filled with Teflon or other high temperature nickel-based material to seal the labyrinth seals from the fluidized particles. High temperature bearings may also be positively pressurized to prohibit particle intrusion.

Figure 11C:
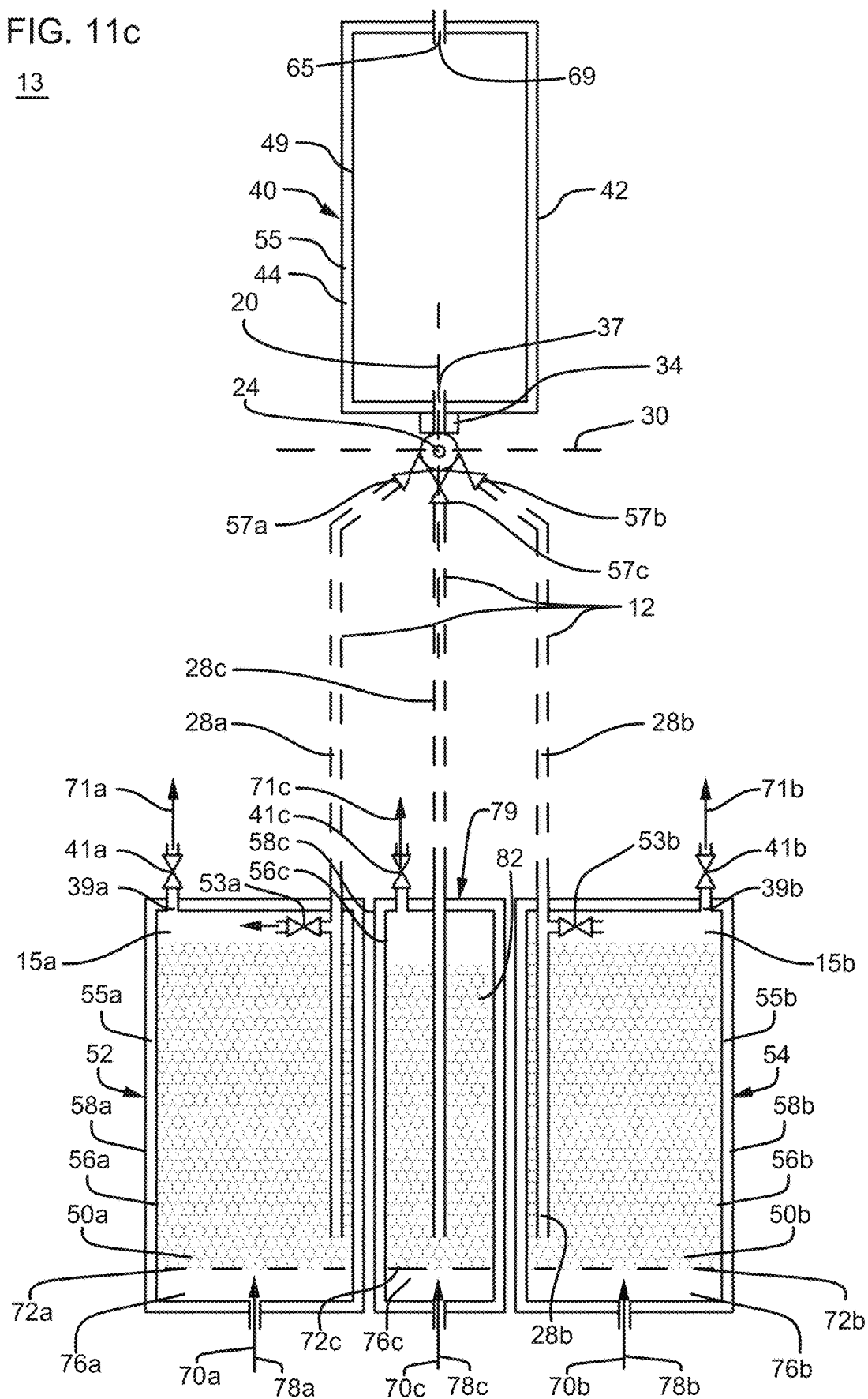
FIG. 11c illustrates a cross-sectional view of an exemplary rotational molding device with heated fluidized bed particles voiding a mold cavity, according to an exemplary disclosed embodiment.

FIG. 11c illustrates a cross sectional view of a rotational molding device 13 with heated fluidized bed particles 50a discharging back into heated fluidized bed vessel 52, thereby voiding or emptying the mold 40 cavity. In some embodiments, particle fill valve 53a and vessel exhaust valve 41a may open to allow fluidized bed bulk transport of heated particles 50a to fall downward with gravity, thereby returning to their original vessel 52. In some embodiments, the diameter of the aperture opening 37 in relation to the diameter of particles 50a may be sufficient to allow for proper gravitational draining in less than one minute. In some embodiments, first powered bearing 24 may rotate through an arc pattern to provide constant and uniform discharge of particles 50a through aperture 37. The arch range may be as high as +/−45°, for example. In other embodiments, the arch range may be as high as +/−15°. The period may range from 5 seconds to 30 seconds, with faster cycle times producing more uniform discharging conditions within mold 40. Additionally, and/or alternatively, second powered bearing 34 may rotate 360° to set up a centrifugal effect and further speed up the discharging process.

Figure 11D:
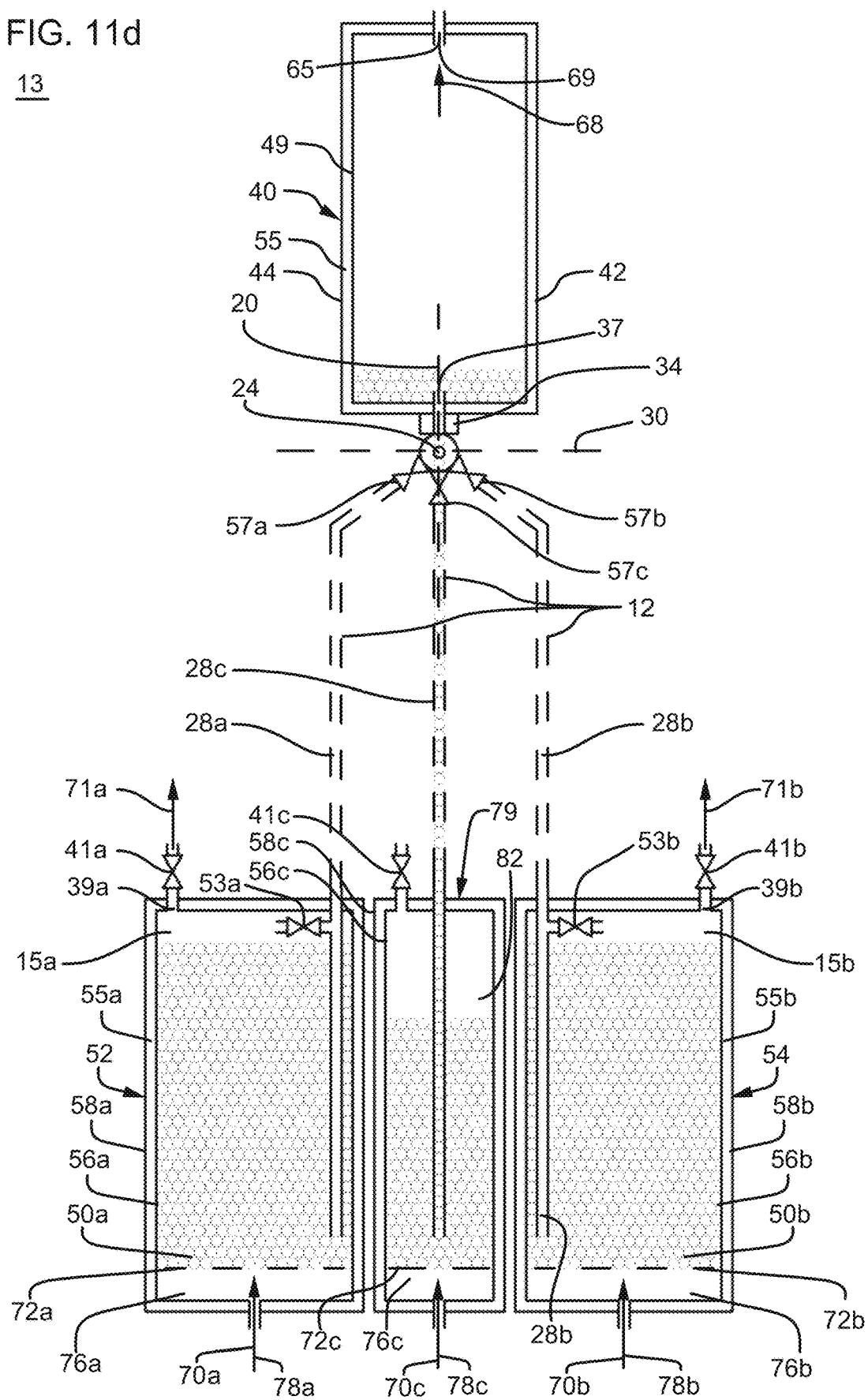
FIG. 11d illustrates a cross-sectional view of an exemplary mold charged with pre-heated and pre-dried fluidized thermoplastic powder, according to an exemplary disclosed embodiment.

FIG. 11d illustrates a cross sectional view of a rotational molding device 13 injecting pre-heated and pre-dried fluidized bed thermoplastic powder into the cavity of preheated mold 40. In some embodiments, vessel valve 41c may at least partially close while valve 57c opens to allow fluidized bed bulk transport of thermoplastic powder 82 to push upwards through particle infeed tube 28c. Thermoplastic powder 82 may traverse into the mold 40 cavity through first powered bearing 24, second powered bearing 34, and aperture 37. Furthermore, pressurized air flow 70c may partially fill the interstitial space of mold 40 with a predetermined amount of thermoplastic material known as the shot weight. In some embodiments, heating element temperature may be equal to or lower than the vicat softening point of the thermoplastic to avoid agglomerating of the thermoplastic powder particles 82. Preheating the thermoplastic powder to just below the vicat softening point or agglomerating point may further reduce sintering times by up to 40% with plastic layering occurring without delay upon the particles entering. Furthermore, thermoplastic material may be substantially dried by inlet air flow 70c, thereby eliminating the potential for moisture to cause bubbles or defects in thermoplastic part 46 and minimizing agglomeration of particles for a more even sintering process.

Figure 11E:
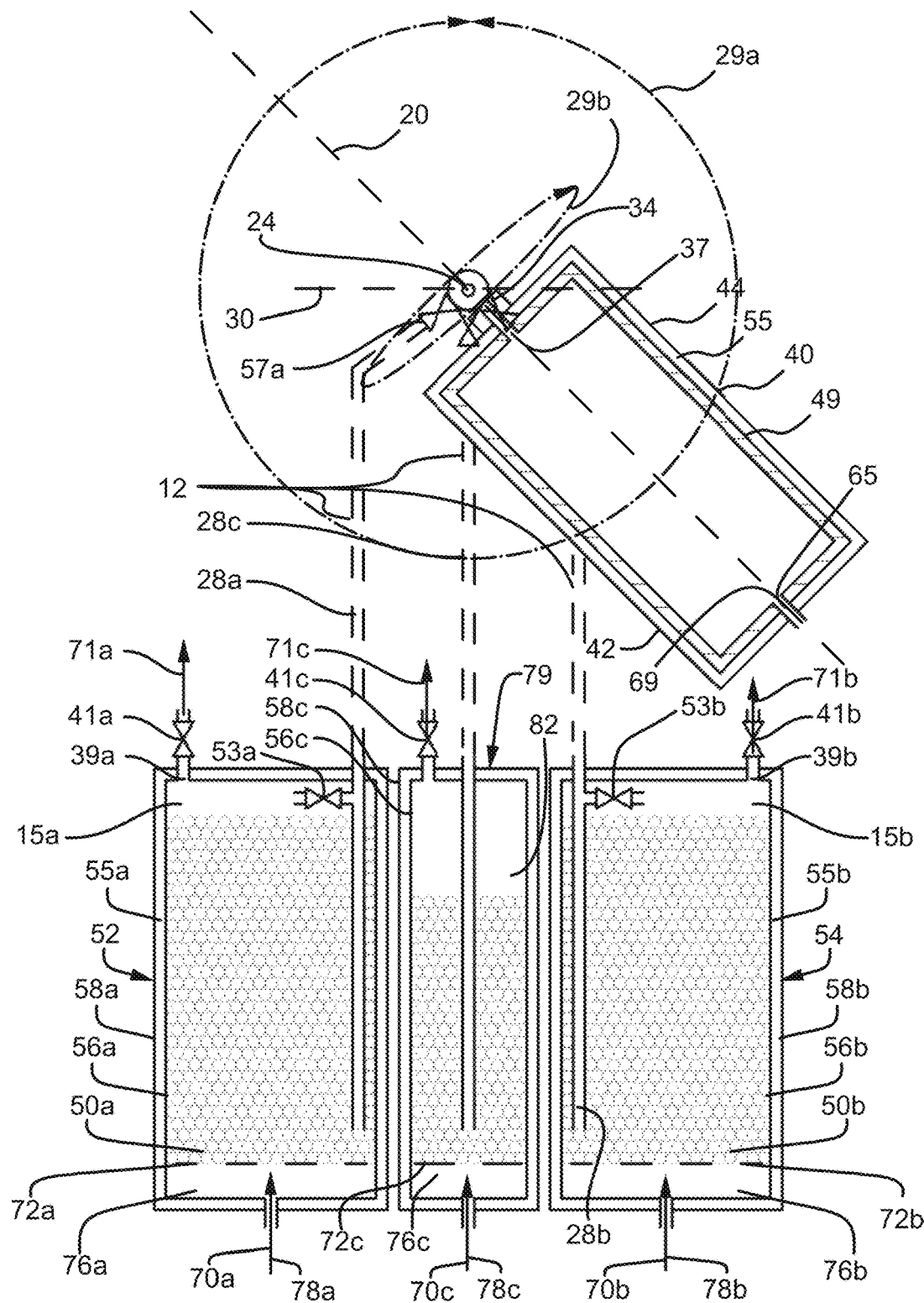
FIG. 11e illustrates a cross-sectional view of an exemplary sintering thermoplastic part within a biaxially rotated mold internally conditioned by fluidized bed particles and thermoplastic powder, according to an exemplary disclosed embodiment.

FIG. 11e illustrates a cross sectional view of a rotational molding device 13 in 360° biaxial rotation, sintering thermoplastic part 46. Thermoplastic part 46 may be formed utilizing the thermal energy stored by the thermal mass of mold 40. The frame 12 may comprise a mechanism for movement along first axis 20 and second axis 30 positioned orthogonal to the first axis 20. The rotational speed about axes 20 and 30 may be dependent on the shape and aspect ratio of thermoplastic part. Exhaust air port 69 may be closed during the sintering process to build pressure within mold 40. In other embodiments, exhaust air port 69 may be opened to maintain atmospheric pressures depending upon the desired part affect. Particle aperture 37 may be closed to inhibit thermoplastic powder from falling back down through infeed tube 28c.

A plurality of vessels 79 containing various thermoplastic compounds may be connected to mold 40 to allow for a layering of different compounds during a single sintering cycle. Additional thermoplastic material may be released into the cavity of mold 40 over time during the sintering and densification process, in for example, applications where parts have limited volume. The pre-heated mold 40 and pre-heated thermoplastic powder may further reduce sintering times, for example, between two (2) and six (6) minutes, depending upon wall thickness. In some embodiments, a thermoplastic powder, such as, for example, polypropylene powder, may be preheated to 212° F. and may be injected into a mold preheated to 450° F. The polypropylene powder may sinter in less than four minutes in mold 40 having a wall thickness of ⅛-inch and may sinter in less than six minutes in mold 40 having a wall thickness of ¼-inch. In contrast, conventional rotational molding may utilize heating cycles that range from fourteen (14) minutes to thirty (30) minutes, depending upon wall thickness. In some embodiments, heated particles from vessel 52 may be re-instituted into the interstitial space of thermoplastic part 46 to provide additional thermal energy for remaining partially-densified thermoplastic powder. In some embodiments, for greater wall thicknesses, heating from the inside of part 46 may speed up the consolidation of the partially sintered thermoplastic resin, thereby further accelerating formation and reducing the potential for formation of voids, cracks, or bubbles.

The "tack temperature" refers to the temperature at which the powdered material 82 adheres to the interior mold surface. Different powder material 82 may have different tack temperatures. In some embodiments, the thermoplastic powder may be cryogenically cooled before insertion into preheated mold 40. The pre-cooled powder material 82 may adhere to the pre-heated surface more uniformly by slowing down the formation of the first particle depositions.

In some embodiments, it may be desirable to have the powder material 82 adhere to the inside surface of mold 40 non-uniformly. For example, the mold 40 may be constructed out of various types of metals, each with its own specific heat capacity and thermal mass, thereby producing variable wall thickness. Specific areas of mold 40 may be externally insulated while other areas are externally convectively cooled such that variable wall thickness may be achieved. The mold 40 may be provided with an arrangement that may prevent the powder material from uniformly adhering to the surface of the mold 40. To that end, embodiments of the present disclosure contemplate varying the speed of armature and/or molding plate to move the mold non-uniformly or providing external cooling to a specific location of the mold.

Persons of ordinary skill in the art would appreciate that using multiple small charges of powder material 82, instead of one large charge, may provide time for bubbles within the melt to migrate to the surface and dissipate before being trapped in the polymerizing material. As the material 82 polymerizes, it may become more viscous, thereby effectively inhibiting bubbles from escaping.

There may be four main stages that a mold material 82 may undergo during a rotational molding process, including powder consumption (tacking), coalescence (sintering), densification (defoaming), and solidification (crystallization). The mold material 82, at each stage, may have unique rheological characteristics. Heated fluidized bed particles and cooled fluidized bed particles may be repeatedly introduced into mold cavity 40 during various portions of the cycle in order to create a desired effect on the resulting thermoplastic part 46.

Figure 11F:
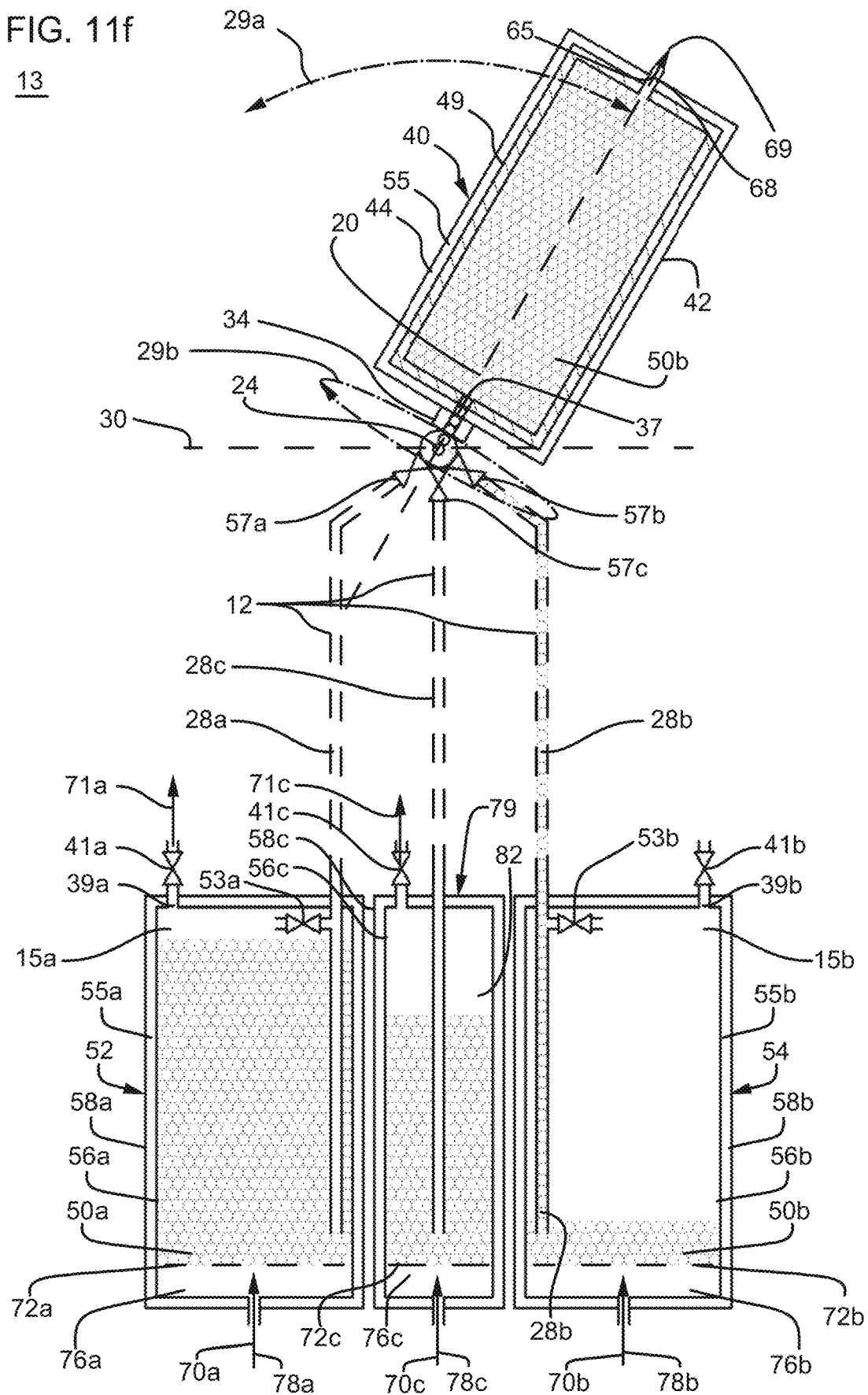
FIG. 11f illustrates a cross-sectional view of an exemplary thermoplastic part directly cooled by internally fluidized bed particles, according to an exemplary disclosed embodiment.

FIG. 11*f* illustrates a cross sectional view of a rotational molding device 13 directly cooling thermoplastic part 46 through internal fluidized bed conditioning. Embodiments of the present disclosure may increase efficiency in rotational molding by allowing the quenching operation to be performed apart from the heating operation. In some embodiments, valve 41*b* may at least be partially closed while valve 57*b* opens to allow fluidized bed bulk transport of cooled particles 50*a* to push upwards through particle infeed tube 28*b*. Cooled fluidized particles 50*b* may traverse into the mold 40 cavity through first powered bearing 24, second powered bearing 34, and aperture 37. Furthermore, pressurized air flow inlet 70*a* may substantially fill the interstitial space of thermoplastic part 46 with particles 50*b*, while utilizing enough airflow to create a bubbling and vibration phenomena. Mold exhaust air 68 may escape out of one or more exhaust valves 69. In some embodiments, outlet particle filter 65 may maintain cooled particles 50*b* within mold 40. In some embodiments, first powered bearing 24 may rotate through an arc pattern to provide constant and uniform fluidization from entering pressurized air 71 through aperture 37. The arc range may be as high as +/−90°, for example. In other embodiments, the arc range may be as high as +/−45°. The period may range from 5 seconds to 30 seconds, with faster cycle times producing more uniform fluidizing conditions within mold 40. Additionally, and/or alternatively, second powered bearing 34 may rotate 360° to further facilitate internal mixing and fluidization. Thermoplastic part 46 may be cooled below its crystallization temperature through the enhanced heat transfer coefficient attributable to the bombarding action of solid particles 50*b* on the gas film boundary layer. Thermal energy extraction through the inside of part 46 may exceed thermal energy input from mold inside surface 49. Internal conditioning with cooling fluidized bed particles may allow crystallization of thermoplastic part 46 without cooling of mold 40, thereby leading to reductions in energy utilization and reduced cooling times. In some embodiments, positive pressure exerted from the fluidized cooled particles may minimize or eliminate internal stresses which lead to warping or excessive shrinkage. This positive pressure may force a crystalizing and naturally shrinking thermoplastic part from pulling away from the inside of mold 40, thereby reducing warpage potential. The temperature of particles 50*b* may be controlled depending on the part geometry, wall thickness, and type of thermoplastic powder utilized. Cooling may continue until inside surface of mold 40 monitored by a first thermocouple 85 has reached a predetermined value. In some embodiments, minimal cooling may be employed, thereby targeting only the reduction of the thermoplastic part 46 to crystallization temperature.

Figure 11G:
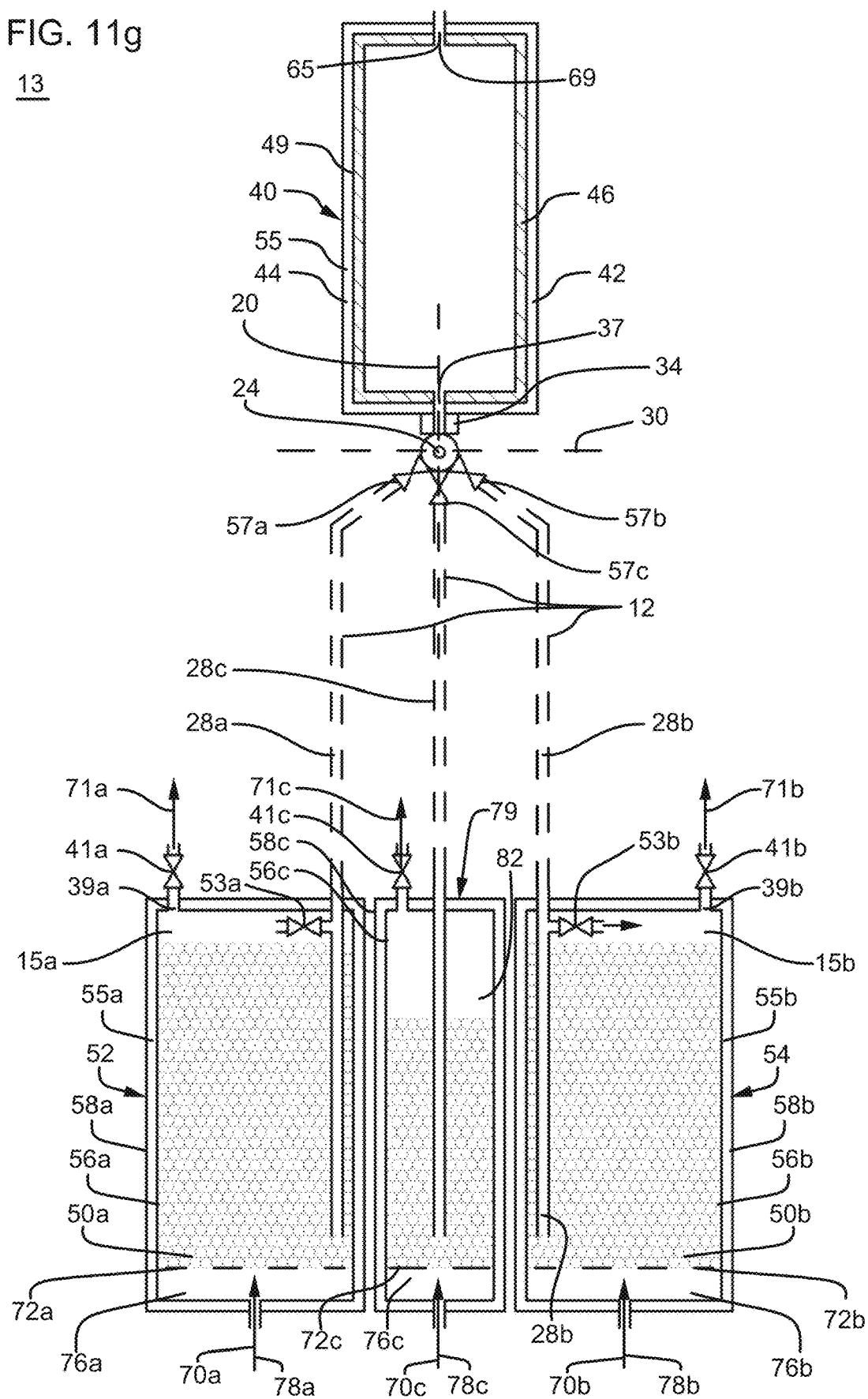
FIG. 11g illustrates a cross-sectional view of an exemplary rotational molding device with cooled fluidized bed particles voiding a fully formed thermoplastic part, according to an exemplary disclosed embodiment.

FIG. 11*g* illustrates a cross sectional view of a rotational molding device 13 with cooled particles 50*b* discharging back into cooled fluidized bed vessel 54, thereby voiding or emptying the mold 40 cavity. In some embodiments, particle fill valve 53*b* and vessel exhaust valve 41*b* may open to allow fluidized bed bulk transport of cooled particles 50*b* to fall downward with gravity, thereby returning to their original vessel 54. In some embodiments, the diameter of the aperture opening 37 in relation to the diameter of particles 50*b* may be sufficient to allow for proper gravitational draining in one (1) minute or less. In some embodiments, draining may occur in less than 10 seconds. In some embodiments, first powered bearing 24 may rotate through an arc pattern to provide constant and uniform discharge of particles 50*a* through aperture 37. The arc range may be as high as +/−45°, for example. In other embodiments, the arc range may be as high as +/−15°. The period may range from 5 seconds to 30 seconds, with faster cycle times producing more uniform discharging conditions within mold 40. Additionally, and/or alternatively, second powered bearing 34 may rotate 360° to set up a centrifugal effect and further speed up the discharging process.

Figure 11H:
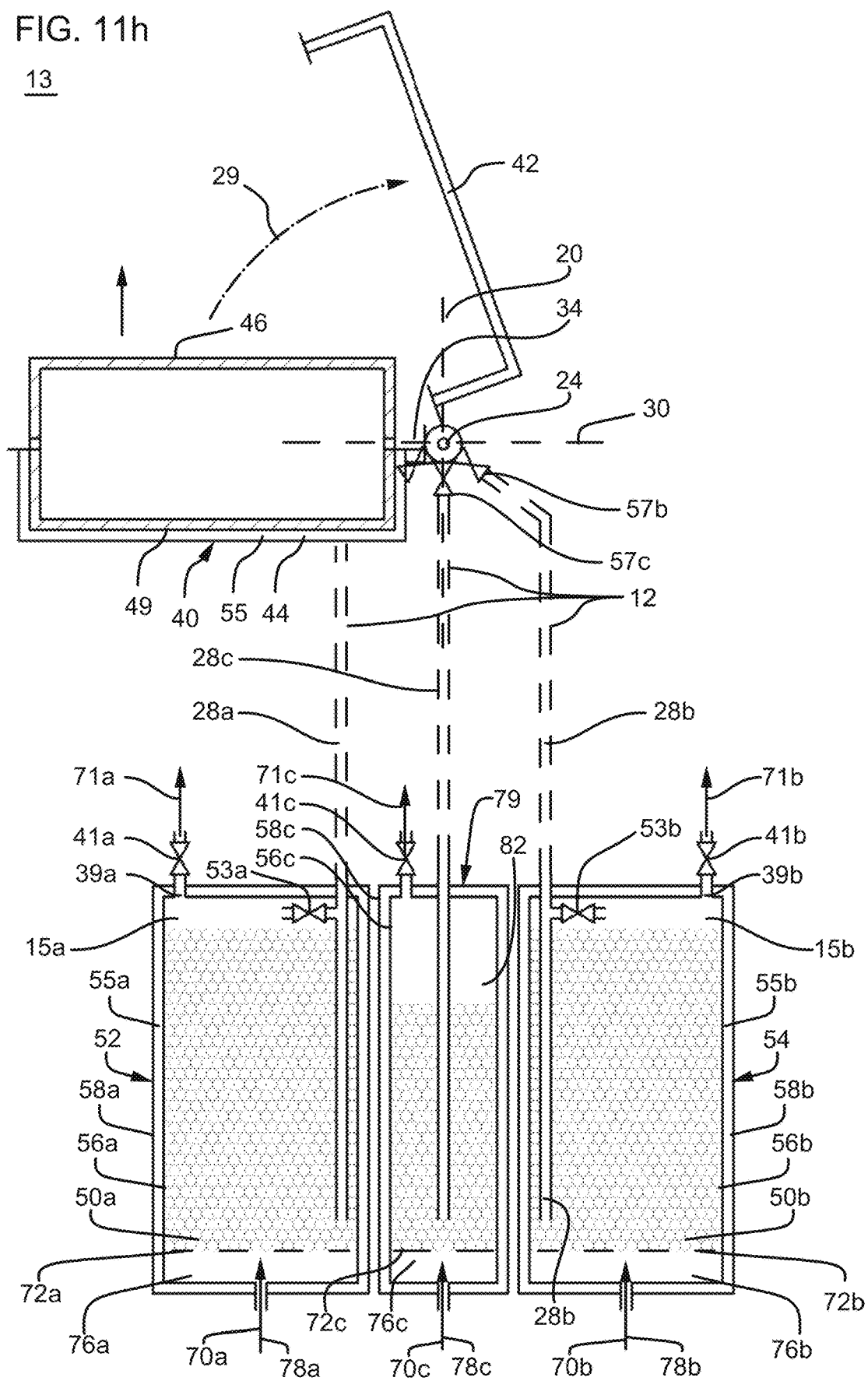
FIG. 11h illustrates a cross-sectional view of an exemplary rotational molding device with demolded final thermoplastic part, according to an exemplary disclosed embodiment.

FIG. 11*h* illustrates a cross sectional view of a rotational molding device 13 in demolding of completed thermoplastic part 46. In some embodiments, mold 40 may be rotated to a predetermined angle for demolding. In some embodiments, mold base 44 may be attached to powered bearing 24 independent from mold lid 42. Mold lid 42 may be substantially separated from mold base 44 about second axis 30 moving along arc 29. Furthermore, this may facilitate the removal of thermoplastic part 46 vertically upwards. Mold 40 may still be at a substantially elevated temperature as the internal cooling has just targeted the thermoplastic part 46. Mold lid 42 may be closed along arc 29 and substantially sealed for the rotational molding cycle to immediately begin again.

Figure 12:
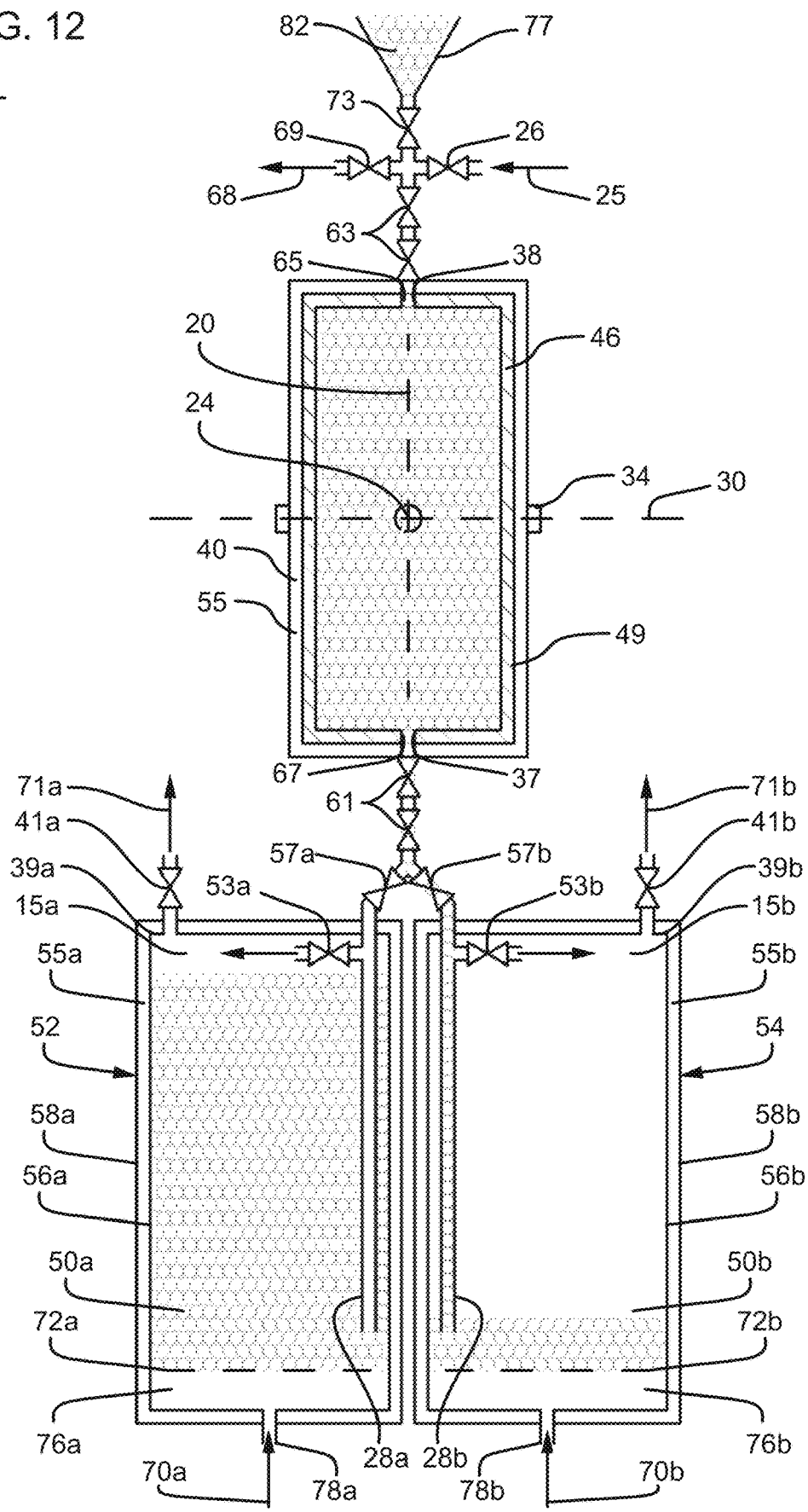
FIG. 12 illustrates a cross-sectional view of an exemplary rotational molding device internally conditioned via fluidized bed particles originating from a fluidized bed with fully detachable mold, according to an exemplary disclosed embodiment.

FIG. 12 illustrates a cross sectional view of an exemplary embodiment of an internally conditioned rotational molding device 13 according to the present disclosure. The internally conditioned rotational molding device 13 may comprise a removable mold 40 for molding a part 46. The mold 40 may comprise an internal heating or cooling system. The internal heating or cooling system may comprise one or more apertures 37 configured to selectively introduce fluidized particles 50 into the cavity, or selectively allow fluidized particles to flow out of the cavity.

Mold 40 may be separated and detached via inlet mold valve 61 and outlet mold valve 63. In some embodiments, this may allow mold 40 to be separated from fluidizing vessels 52, 54 and powder hopper 77. Mold 40 may be biaxially rotated during the sintering process remotely from particle sources; thereby allowing for other molds to utilize the connections. In some embodiments, a robot (not shown)

may pick up mold 40 and spin the mold about first and second axes 20, 30. Thermoplastic powder 82 may be contained within hopper 77 and may be gravitationally introduced with powder valve 73 open, compressed air valve 26 closed, outlet disconnect valve open, and mold exhaust valve closed. In some embodiments, compressed air 25 with valve 26 open may pressurize mold 40 cavity. Positive pressure from compressed air 25 may aid in a removal of particle 50a and 50b during the cavity voiding process.

Figure 13:
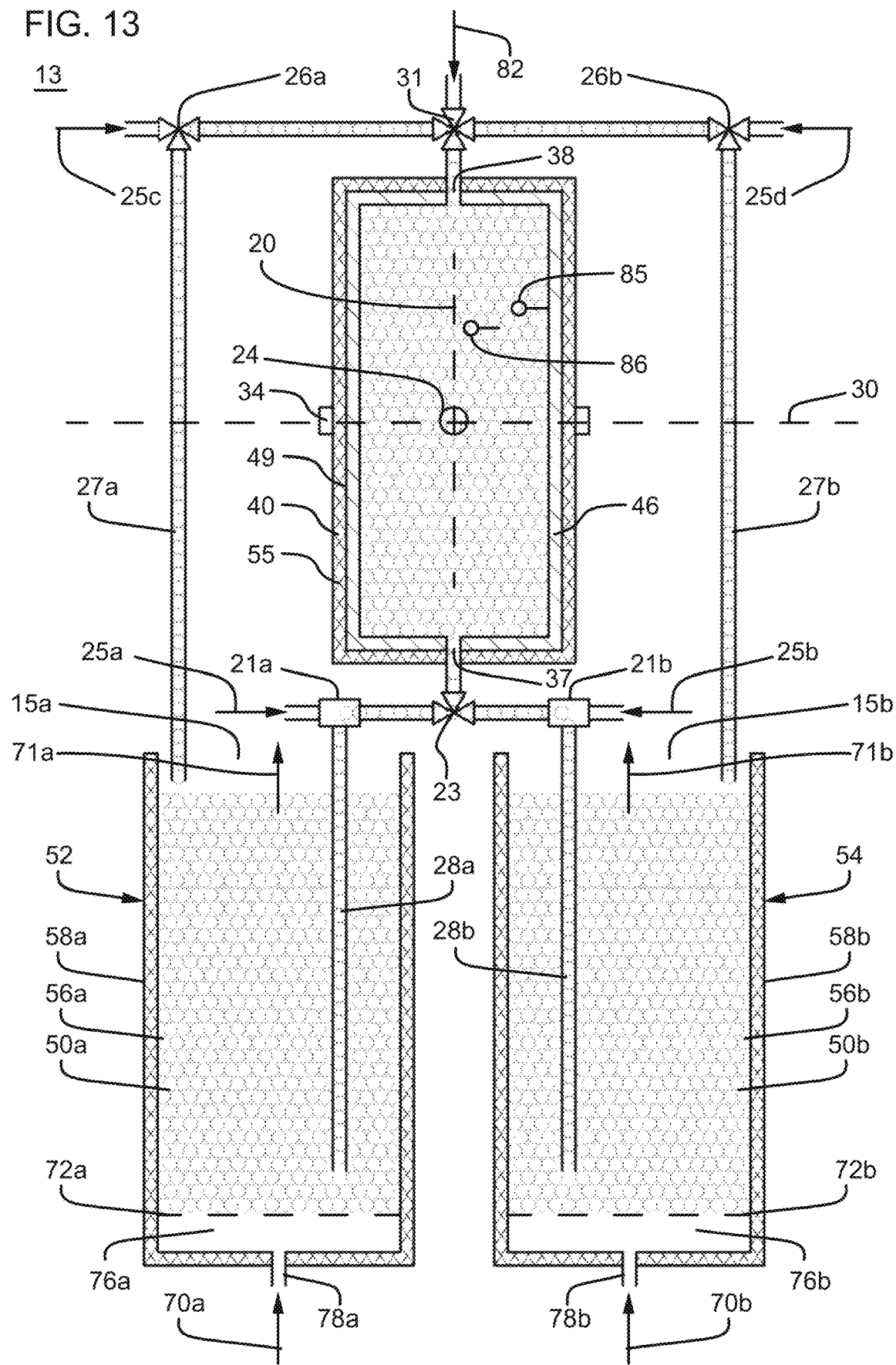
FIG. 13 illustrates a cross-sectional view of an exemplary rotational molding device internally conditioned via circulating fluidized bed particles, according to an exemplary disclosed embodiment.

FIG. 13 illustrates a cross sectional view of an internally conditioned rotational molding device 13 with circulating fluidized particles 50 according to the present disclosure. The rotational molding device 13 may comprise an internal fluidized particle heating and cooling system, comprising a first aperture 37 configured to selectively introduce circulating fluidized bed particles into the cavity. The rotational molding device 13 may also include a second aperture 38 configured to selectively open and allow circulating fluidized particles out of the cavity, while the first aperture 37 may be configured to introduce a quantity of circulating fluidized particles into the cavity. The rotational molding device 13 may also include a single dual-flow aperture that may provide both a supply of circulating fluidized particles into the cavity and may also provide a passage for circulating fluidized particles out of the cavity. The dual-flow aperture may be used with a series of valves to control the number of fluidized particles flowing into and out of the cavity. The circulating fluidized bed rotational molding device 13 may comprise a biaxially rotating mold 40, heated fluidized vessel 52, and cooled fluidized vessel 54.

The circulating fluidized rotational molding device 13 may comprise an internal fluidized particle heating system. Compressed air 25a may enter a first aspirator pump 21a, thereby drawing particles 50a from vessel 52 through infeed tube 28a by a partial vacuum generated by the venturi effect. Pump 21a may be selected from a variety of different types of positive displacement pumps including, but not limited to, diaphragm, plunger, circumferential-piston, bellows, gear, lobed, flexible-vane, nutaling, peristaltic, centrifugal, volute, and peripheral. Pneumatic conveying may involve fluidization of the particles 50a inside vessel 52 by pressurized air flow 70a in addition to compressed air 25a. Liquids have internal cohesion and may be directly sucked, but a powder may be carried by a medium, such as a gas. The internal friction with a particle may be higher than in a liquid. Heated particles 50a may pass through an open valve 23 and into the cavity of mold 40 via aperture 37. After a period of residence time, heated particles 50a may exit the mold 40 via aperture 38 and may pass through open valves 31 and 26a. Particle return standpipe 27a may deposit particles 50a back into heated vessel 52.

In some embodiments, circulating fluidized bed rotational molding device 13 may comprise an internal fluidized bed particle cooling system. Compressed air 25b may enter a first aspirator pump 21b, thereby drawing particles 50a from vessel 54 through infeed tube 28b by a partial vacuum generated by the venturi effect. Pump 21b may be selected from a variety of different types of positive displacement pumps including, but not limited to, diaphragm, plunger, circumferential-piston, bellows, gear, lobed, flexible-vane, nutaling, peristaltic, centrifugal, volute, and peripheral. Pneumatic conveying may involve fluidization of the particles 50b inside vessel 54 by pressurized air flow 70b in addition to compressed air 25b. Cooled particles 50b may pass through an open valve 23 and into the cavity of mold 40 via aperture 37. After the desired residence time, cooled particles 50b may exit the mold 40 via aperture 38 and pass through open valves 31 and 26b. Particle return standpipe 27b may deposit particles 50b back into heated vessel 54.

In some embodiments, a control system (not shown) may operate the circulating fluidized particles 50b. The rotational molding device 13 may comprise an internal fluidized bed particle cooling system comprising first aperture 37 and second aperture 38, and the control system may be in operable communication with the cooled fluidized particle supply vessel 54. The control system may operate the internal fluidized particle cooling system to allow the circulating fluidized particles 50b to extract thermal energy from the inside surface of a part at a greater rate than that of the thermal conduction gain between the outside surface of a part and hot inside surface of the mold, based upon the measure temperatures of first thermocouple 85 and second thermocouple 86.

Figure 14A:
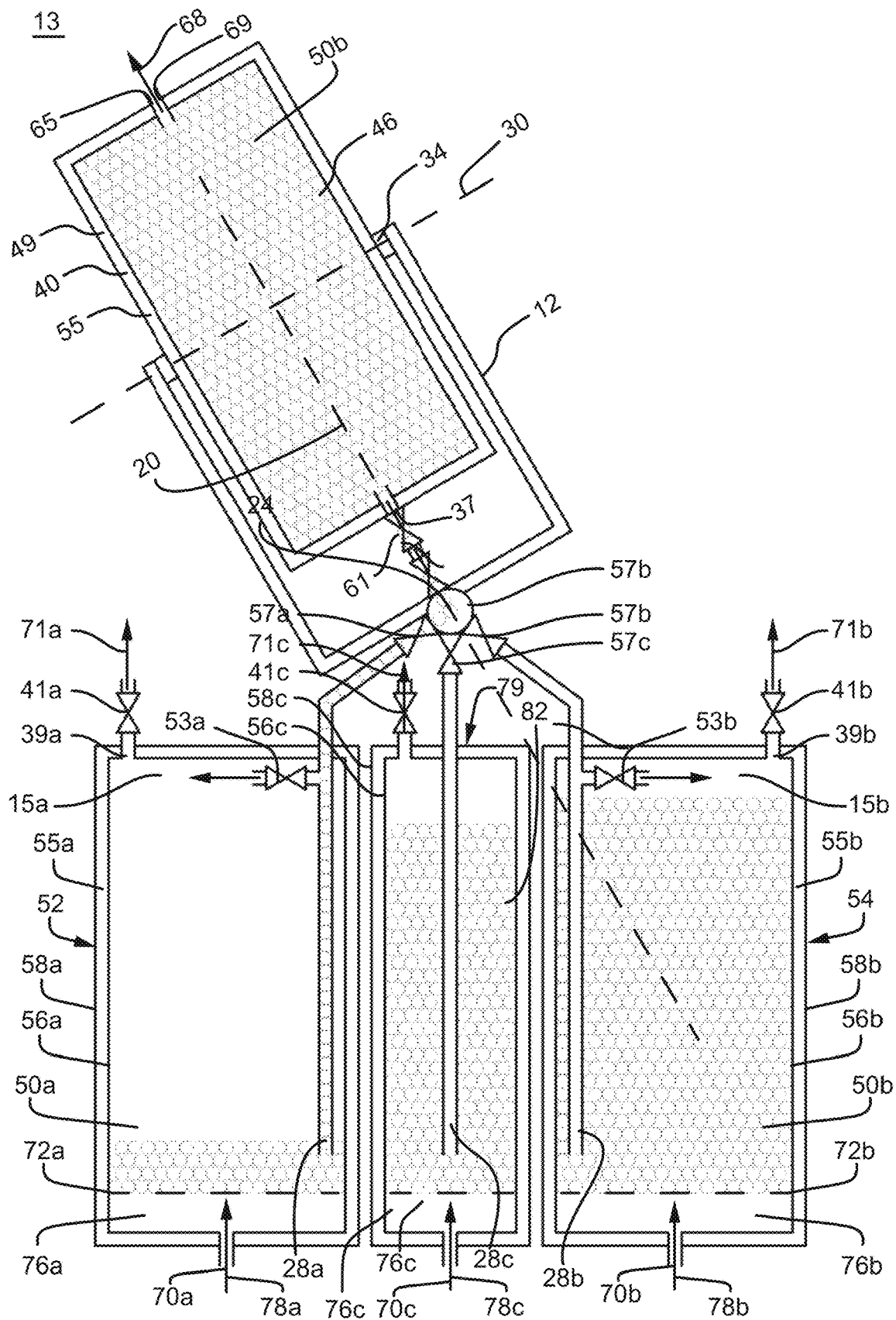
FIG. 14a illustrates a cross-sectional view of an exemplary partially detachable rotational molding device internally preheated via heated fluidized bed particles, according to an exemplary disclosed embodiment.
Figure 14B:
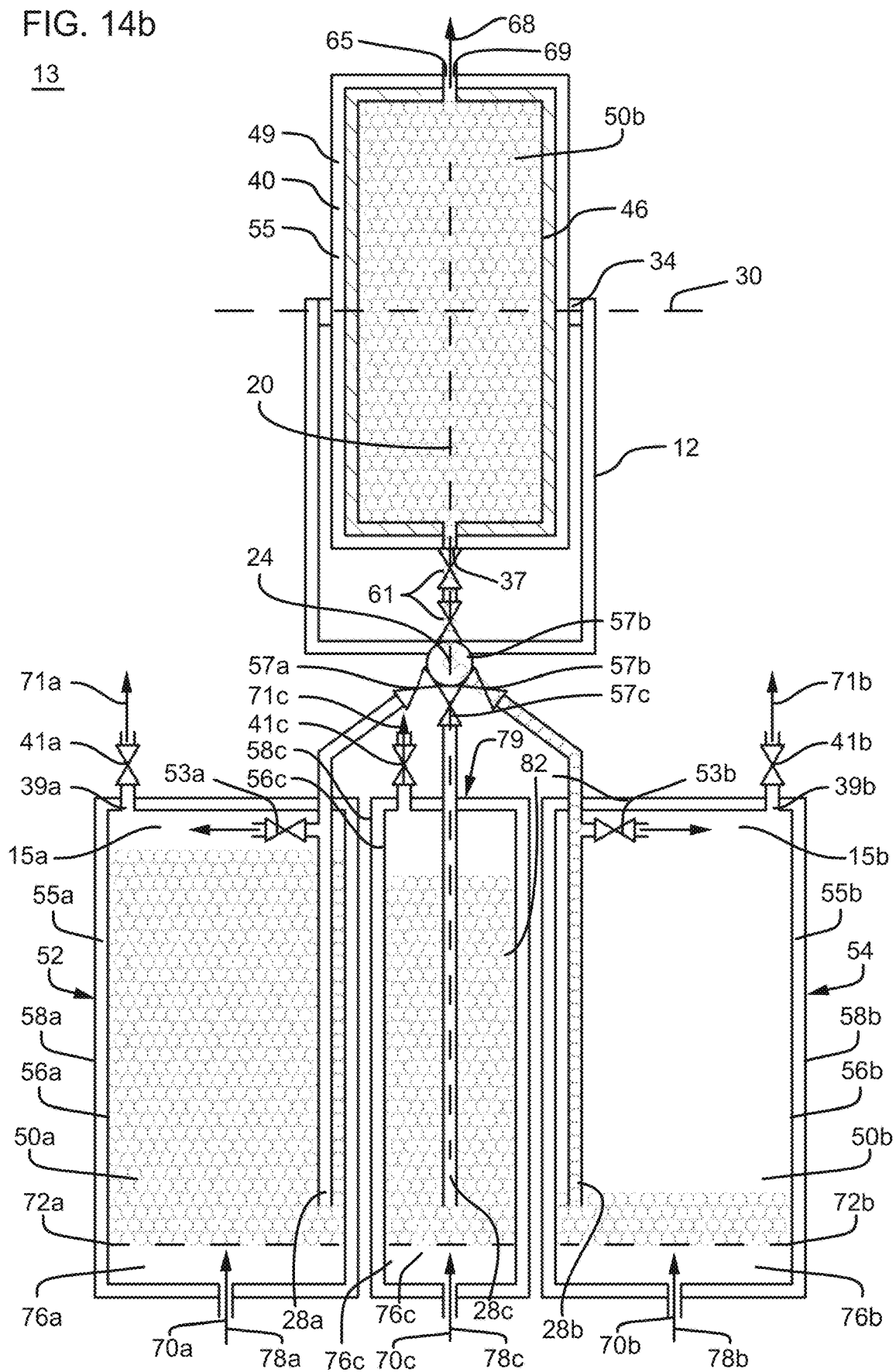
FIG. 14b illustrates a cross-sectional view of an exemplary thermoplastic part directly cooled by internally fluidized bed particles and a partially detachable rotational mold, according to an exemplary disclosed embodiment.

FIGS. 14a and 14b illustrate cross sectional views of an exemplary embodiment of an internally conditioned fluidized bed rotational molding device 13 according to the present disclosure. The internally conditioned rotational molding device 13 may comprise a disconnect valve 61 for mold 40 for molding a part 46. The mold 40 may comprise an internal heating or cooling system that may comprise one or more apertures 37 configured to selectively introduce fluidized particles 50 into the cavity, or selectively allow fluidized particles to flow out of the cavity. In some embodiments, mold 40 may be partially separated and detached via inlet disconnect valve 61, thereby allowing second axis 30 freedom to rotate 360° without direct connection to vessel 52, 54, or 79.

In some embodiments, fluidized particles 50 may be spherical with a pore-free surface morphology. The volume diameter may be defined as the diameter of a sphere having the same volume as the particle. Natural and man-made solid particles may occur in almost any imaginable shape, and most particles of practical interest are irregular in shape. Embodiments of the present disclosure contemplate the use of various fluidized particles 50, including spherical and non-spherical particles depending on a rotational molding application. For a true sphere, the degree of sphericity may be equal to 1. For non-spherical particles, the sphericity may be less than 1. In some embodiments, the sphericity of particles 50 may be between 0.7 and 1.0. In other embodiments, the sphericity of particles 50 may be between 0.9 and 1.0. Commonly occurring non-spherical particles may include round sand, sharp sand, crushed sandstone, pulverized coal, crushed coal, activated carbon, mica flakes, limestone, gypsum, talc, common salt, crushed glass, silica gels, silica carbide, tungsten powder, sillimanite, and wheat.

For nonporous particles, particle density may be the mass of the particle divided by the volume of the particle. Methods for classifying powders may include sieving the particles through a series of screens with standardized mesh size by sifting, swirling, shaking, or vibrating. Direct measurement of particle dimensions may also be possible from enlarged photographic or electronic images of microscopes, i.e., optical microscope, scanning electron microscope, and transmission electron microscope.

Various means have been established to classify particles that may be useful in fluidized bed rotational molding device 10. These means may include arithmetic mean, surface mean, volume mean, volume-surface mean, weight mean, length mean, geometric mean, and harmonic mean. Two characteristics of particle rheology for internal fluidized bed vessels may be the angle of repose and the angle of internal friction, which may be refer to a shearing plane of the powder. Particles 50 may flow out of orifice 37 if the angle of repose of particles 50 is higher than the angle of internal friction of particles 50. Particles 50 may have angles of internal friction ranging from 50° to 70°.

One operating cost for fluidized rotational molding device 10 may be the pressure drop through the packed bed of solids. Thus, the design and operation of fluidized vessel 51 may be informed by a study of packing characteristics of particles and their effect on pressure drop through the bed. In some embodiments, particles 50 may comprise uniform and regular mono-sized spherical particles. Voids may be independent of the particle size and may range from a simple rhombic layer of packing (as illustrated in FIG. 1) with a voidage of 0.2595 to a cubic packing with a voidage of 0.4764. Voidage may refer to the amount of space between each particle when the particles are packed together. The stability of the fluidized vessel 51 may increase as the voidage decreases.

Random packings of uniform mono-sized spheres may be created by irregular and random arrangements of particles. The coordination number, which is the number of spheres in contact with neighboring spheres, may be used to characterize the voidage of vessel 52. Coordination number and may also affect thermal transfer. For example, coordination numbers of 9 to 12 may be achievable with rhombohedral orientation in at least two orientations. Additionally, and/or alternatively, layer spacing may be between 70% and 100%. In some embodiments, pressure gradient differences between the top and the bottom of vessel 51 may be mitigated by internally pressuring mold 40 to ensure particles stay out about 4 psi at the bottom of vessel 51.

In some embodiments, for example, fluidized bed particles 50 may be a proppant. Proppants may refer to particulates that generally resist high temperature, pressure, and closure stresses present in geological formations. If proppants fail to withstand the closure stresses of the formation, they may disintegrate to produce fines or fragments, which may reduce the permeability of the propped fracture. Proppants may comprise silica sand, glass beads, walnut shells, aluminum microspheres, aluminum oxide sand, and resin-coated and ceramic microspheres.

In some embodiments, silica sand, such as Walhadron sand, may be used in fluidized beds of disclosed embodiments. In other embodiments, 50 to 100 grit, and more preferably, 70 grit, sand from Dinamec or Schwing-Technologies, may be used in the fluidized bed. The uniform size and round shape for particle packing may create a bed with lower pressure drop.

In some embodiments, a durable, round, mono-sized and smooth proppant may be utilized with mean particle diameters of 575+/−20 microns, roundness greater than 0.9, sphericity greater than 0.9, and specific gravity less than 2.83, and more preferably less than 1.50. The aforementioned characteristics may limit particle intrusion into the gaps between mold lid lip seal 43 and mold base lip seal 45. Some embodiments of the present disclosure may employ a proppant with low and uniformly distributed internal porosity. These characteristics generally provide a particle with relatively high compressive strength and durability, thus reducing fines which may penetrate molds and contaminate thermoplastic parts.

For example, in one embodiment, less than 2% by weight of fines may be generated at 12,500 psi according to API/ISO crush test. High internal porosity with irregular distribution may reduce strength, thereby creating fines that may increase bed pressure drop and may contaminate thermoplastic parts. A non-porous surface finish with a low coefficient of friction may be provided for internal fluidized bed rotational molding during the cooling phase whereby particles are in direct contact with hot, molten thermoplastic. It may be desirable for the particles not to stick or embed themselves in the thermoplastic resin.

Embodiments of the present disclosure contemplate the use of spheres or microspheres. Persons of ordinary skill in the art would appreciate that suitable methods or processes may be used to produce solid or hollow shells, such as spheres or microspheres. For example, solid microspheres have been formed from glass, ceramic, metal, plastic, and other inorganic and organic materials. In some embodiments, silica sand proppant with a thin coating containing hollow glass microspheres may be utilized. In other embodiments, lightweight ceramic proppants with specific gravities ranging from 2.65 to 3.0 made from calcined Kaolin clay may be utilized. In other embodiments, alumina and silica ceramic proppants with density of approximately 2.65 $g/cm^3$ showing less pressure drop and low friability may be utilized. In other embodiments, resin-coated ground nut hull proppants with specific gravities ranging from 1.25 to 1.35 may be utilized and may have lower weight reducing fan power requirements to fluidize the particles. In other embodiments, a proppant using quartz, shale, bauxite, talc, and wollastonite as raw materials with densities of 2.62 $gr/cm^3$ may be utilized. In other embodiments, a lightweight ceramic proppant with apparent specific gravities ranging from 1.4 to 1.9 made by a sol-gel process may be utilized. In other embodiments, strong, lightweight metallic hollow shells may be utilized.

Gas distributor 72 may comprise omnidirectional pores for effective torturous path filtration to provide consistent air flow upwards across the entire base of vessel 51. Gas distributor 72 in a fluidized vessel 51 preferably produces relatively uniform and stable fluidization across the entire bed cross-section. It helps prevent nonfluidized regions on the grid, operates for long periods (e.g., years) without plugging or breaking, minimizes weepage of solids into the plenum beneath the grid, minimizes attrition of the bed material, and supports the weight of the bed material during startup and shutdown.

Gas distributor 72 may comprise perforated plates, bubble caps/nozzles, sparger, conical grids, and pierced sheet types of grids. In some embodiments, gas distributor 72 may comprise multiple layers of diffusion-bonded stainless steel 316L mesh or other alloys. Diffusion bonded steel may provide a balance of strength and "jet free" air introduction. Gas distributor 72 may continuously handle high operating temperatures typically found in the rotational molding industry of 500° F. to 650° F., or higher. A self-supporting gas distributor plate may reduce the need for complex and expensive support structures or a joining strip. In some embodiments, gas distributor 72 may comprise non-shedding media to avoid contamination of the fluidized particles 50 and may be resistant to mechanical abrasion.

To increase the gas residence time in the bed, it may be desirable to introduce the greatest number of small gas bubbles as possible into the vessel 51. For gas distributor 72 to achieve equal distribution of gas flow through many parallel paths, gas distributor 72 may include equal resistances, as well as sufficient resistance to equal or exceed the maximum value of any unsteady state pressure fluctuation. In some embodiments, gas distributor 72 may avoid the formation of jets and may form small, uniform bubble formation to provide heat transfer to the rotating mold 40. Erosion in the gas distributor region may primarily be due to high-velocity submerged jets impinging on distributor parts, bed walls, or mold 40 during close-proximity rotational passes. In some embodiments, the ratio of distributor-pressure-drop to bed-pressure-drop may be in the range of 0.015 to 0.4. In some embodiments, air flow turndown may be desired, and the gas distributor 72 may apply minimum gas flow rate, generally coinciding with the maximum heated temperature of vessel 51.

In some embodiments, gas distributor 72 may reduce or eliminate the potential for bed particle inventory 50 to weep through gas distributor 72. Pressure fluctuations may be reduced with the proper selection of distributor 72, which may reduce backflow of solids through the gas distributor holes.

Plenum 76 refers to the chamber immediately below gas distributor 72. In some embodiments, plenum 76 may be provided with a volumetric space to prevent the gas 70 from passing through the closest portion of gas distributor 72. When gas enters plenum 76 from the side, the gas may be routed to the middle of the plenum 76 rather than having the supply pipe end at the wall of the plenum. In some embodiments, a horizontal-to-vertical down gas entry may be utilized.

Once the solid particles 50 are fluidized by air flow 70, the solids inside the vessel 51 may behave like a liquid. The bed surface of a bubbling fluidized bed may resemble that of a boiling liquid and may be stirred. As such, mold 40 may be rotated to move throughout the interstitial space of vessel 51 with little to no drag resistance. Objects with a density lighter than the bulk density of the bed may float and those heavier may sink. A large volume mold 40 may displace an amount of fluidized bed particles 50, and the vessel may be tall enough to accommodate this design displacement. In some embodiments, a drain hole (not shown) may be located towards the bottom of vessel 51 to allow solid particles 50 to flow out. This may facilitate maintenance of the interior of vessel 51 and/or allow solid particles 50 that have become overly contaminated to be replaced with thermoplastic or other sources.

The gas bubble size, shape, formation, rising velocity, and coalescence in the fluidized bed 51 may have quantitative similarity with those of gas bubbles in liquids. The liquid-like behavior of a fluidized bed may thus allow the solids to be handled as a fluid, and may facilitate continuous feeding and withdrawal. Separate reservoirs of heated or cooled solid particles 50 may be provided such that the particles 50 may be pumped in or out of the vessel 51, depending on the forming characteristics of the rotating mold 40. The rigorous mixing in heated vessel 51 may result in a uniform temperature even for the highly endothermic event of lowering the cold mass of mold 40 into heated solid particles 50. Rigorous mixing in cooled vessel 51 may result in a uniform temperature even for the highly exothermic event of lowering the heated mass of mold 40 into cooled solid particles 50.

Rigorous mixing may improve contact between solids and fluid, thereby further enhancing heat and mass transfer between mold 40 and particles 50. Rigorous solids mixing in the bed may produce solid fines through attrition. Operating at high fluidization velocities, fines elutriation and entrainment may be overcome with the proper selection of the particle 50. Fines generated through the elutriation process may enter the gap between mold base 44 and removable mold lid 42, thereby potentially contaminating thermoplastic contained therein.

Solid particles 50 in vessel 51 may be held in suspension by the upward flow of gas 70. The velocity at which the particles first become suspended may be the minimum fluidization velocity. As the gas velocity through the fluidizing plate 72 increases, the particles may pass through a number of flow regimes characterized as bubbling, turbulent, and fast. In some embodiments, the fluidized vessel 51 may be operated at or near the minimum fluidization velocity which may be found by measuring the frictional pressure drop through a bed of particles 50 as a function of the gas velocity 70. At the minimum fluidization velocity, the entire mass of particles 50 may be fully supported by the flow of gas 70. Thus, the pressure drop through the bed may then be equal to the bed weight per unit area.

The density of flowing gas 70 may be inversely proportional to its absolute temperature. Therefore, gas 70 density may decrease with increasing temperature. The viscosity of a gas 70, on the other hand, may increase with increasing temperature. An increase in gas 70 temperature also may increase the voidage of particles 50 within vessel 51. The force acting on a single particle 50 falling though a quiescent fluid may be equal to the particle weight minus the drag force. This relationship may be further effected by factors, such as the flow regime (laminar, turbulent, or intermediate) and the size, density, and shape of the particles.

Pressure may affect the minimum fluidization velocity and may produce bubbling behavior of gas-fluidized beds. Any pressure changes that occur within the bed as a result of bubbles forming and passing through the bed may have an effect on the minimum fluidization velocity, which could lead to local de-fluidization and generally unstable behavior. In some embodiments, the rotation speed and direction of mold 40 may be selected to reduce the effects of local de-fluidization. Generally, increased temperature up to a 370° C. may improve the quality of fluidization in vessel 51.

The overall structure of a fluidized vessel 51 may change as the fluidizing gas 70 velocity increases. At low velocities, the particles thrown by bursting bubbles into the free-board region above the bed surface may fall back after a short time. However, as the velocity of gas 71 increases and bubbling becomes more vigorous, the concentration of particles in the freeboard at any one time may increase. The eruption of bubbles cause pressure fluctuations within the bed, and these fluctuations may increase with increasing velocity. As the gas velocity 71 increases beyond bubbling and into transport velocity, the particles 50 may be transported out of the bed altogether either in dense-phase or in dilute-phase pneumatic transport. These heated particles may present a safety hazard to personnel operating nearby in the form of a slipping hazard or burn potential. Mechanisms for capturing and recycling particles 51 back into vessel 51 may be employed. External cyclones (not shown) may be used in recycling of these particles in order to maintain a constant inventory of particles in the vessel 51.

Characteristics of the gas-solid fluidization of rotational molding device 10 may include bubbles, clusters, and non-uniform flow structures, which may influence the heating and cooling cycle times in forming thermoplastic parts. As the mold 40 is rotated about two or more axes inside of vessel 51, internal obstructions may constantly change. In some embodiments, controlling the pressure of gas flow 70 may ensure that the particles 50 remain in the bubbling regime, and thus may minimize time in the slugging regime. Rising bubbles may cause the particles to move, which may intensify the solids mixing on the macro scale and lead to temperature uniformity and high bed/mold heat transfer characteristics. When the mold 40 is removed from vessel 51, the bed may not contain internals of any sort, and the movement of the bubbles in the vessel 51 may be unrestricted. As bubbles rise, they may gradually coalesce and increase in size, thereby moving horizontally toward the center of the vessel 51. The thermal and energy performance of the rotational molding device 10 may be improved by decreasing the bubble size and renewing the bubble surface for interchanging the gas between bubbles and the interstitial gas. Mass transfer may be improved when bubbles are small and evenly distributed throughout the vessel 51 or within the mold 40.

In some embodiments, baffles (not shown) may prevent bubbles from growing continuously, redistribute bubbles across the cross section of the vessel 51, strengthen the heat and mass exchange between gas and solids, and decrease the rate of solid particle 50 elutriation. With the decrease of the bubble size and velocity, a bed with internal baffles may have a higher bed surface than a free bed at the same gas velocity. Internal baffles may be attached to the rotating mold itself or may be attached to the vessel interior walls 56. Embodiments of the present disclosure contemplate the use of various types of baffles, such as wire meshes, perforated plates, single or multiple-turn plates, or ring baffles.

At some superficial velocity, the upward drag force exerted by the gas 70 on the particles 50 may balance the downward body force of gravity. This may be the condition of minimum fluidization, marking the transition between packed beds and fluidized beds. In some embodiments, particles 50 may have diameters in the range of 50 to 500 microns and densities in the range of 0.2 to 5,000 kg/m$^3$, to facilitate smooth fluidization with increasing gas velocity. Gas velocities above the minimum fluidization velocity may result in the occurrence of gas bubbles in the bed. Accordingly, some fraction of the gas may flow through the suspension of particles as a continuum phase, while the remaining fraction may flow as discrete bubbles rising through the suspension.

In some embodiments, the vessel 51 may be operated in the dense bubbling fluidization. The upper limit of this dense bubbling fluidization may be related to terminal velocity of the particles, beyond which interfacial drag may become sufficient to entrain the particles out of the bed.

When gas 70 velocity in the fluidized vessel 51 exceeds the terminal velocity of the bed particles 50, upward entrainment of particles out of the bed may occur. To maintain solid concentration in the fluidized bed vessel 51, an equal flux of solid particles 50 may be injected (not shown). In some embodiments, screens (not shown) with an opening area smaller than the diameter of particle 51 may be employed to reduce the freeboard height and to retain the particles inside of vessel 51. In some embodiments that utilize internal mold conditioning, solid particles 50 may be injected at the bottom of mold 40. Operation in this regime, with balanced injection and entrainment of particles 50, may be referred to as fast or circulating fluidization. Heat transfer in internal, fast fluidized molds 40 may be affected by volumetric concentration of solid particles 50, as they may be transported by the gas 70 through the bed. In fast fluidized beds, solid particles may be fed into the bed at the bottom, to be entrained by the upward flowing gas 70. The solid and gas phases may pass through the bed in concurrent, two-phase flow. Superficial gas velocities may be between 1 m/s and 10 m/s for uniform heat transfer of the mold 40.

In one embodiment, particles may enter fluidizing system with little vertical velocity and may be accelerated by shear drag of the gas, thereby gaining velocity by momentum transfer from the high-speed gas. This hydrodynamic development may result in the volumetric concentration of solids, decreasing with axial elevation along the length of the mold 40. In some embodiments, several meters of piping leading up to the entry point of mold 40 may be implemented to approach fully developed flow conditions or constant solids concentration. The axial height or length for this hydrodynamic development may increase with increasing particle size, solid mass flux, and mold 40 diameter. A cross-sectional average of approximately 10% to 40% solid concentration for transport flow may be lower than the 40% to 70% solid concentration encountered in bubbling fluidized vessel 51.

Fast fluidized flows or bubbling fluidized beds in general transport may contain an increasing nonuniformity of solid concentration with increasing solid mass flux. At the higher mass fluxes, local solid volume fraction adjacent to the bed wall may approach a magnitude of 40%, as opposed to solid fractions of 10% near the mold centerline. The difference between centerline and inside wall regions may become increase as the total solid mass flux increases. Hydrodynamic behavior inside the mold 40 may vary with each type of mold design. A downward net flow of solid particles 50 in the region near the inside mold wall may affect heat transfer at the wall. Heat transfer may be dependent on the time-averaged local concentration of solid particles and may therefore be influenced by these hydrodynamic characteristics. In some embodiments, a bubbling fluidized flow regime may be maintained within mold 40 with a minimal flux of particles entering and exiting mold 40. This flux may depend on the temperature of particles 50 exiting mold 40 and the general speed of heating or cooling in a particular mold process.

Both the bubbling bed vessel 51 and mold 40 may be cooled or heated in order to maintain a steady thermal state in their respective portions of the mold processing. In some embodiments, the walls transporting the particles 50 or the inside surface of vessel 51 may act as the heat exchange surface by mounting cooling/heating tubes in the walls.

A circulating bubbling fluidized bed may have two complementary characteristics for gas 70 and particle 50 systems. First, particles 50, entrained at a flux, may be separated from the carrying fluid and returned to the bottom of the mold 40, thereby forming a recirculation loop for the particles. Particles 50 may circulate around this loop a number of times before leaving the system, whereas the fluid may pass through only once. Second, dense suspension up-flow or dense pneumatic conveying may occur. During the cooling phase, a three-phase system may exist with gas-particle-liquid plastic on the inside mold surfaces. Particles within the internally circulating fluidized bed may circulate around one or more loops within a plurality of molds 40. Solid particles 50 recirculated through an external solids flow system may involve one or more pumps, venturi nozzles, cyclones, standpipes, and mechanical or non-mechanical valves.

Advantages of a circulating fluidized bed according to embodiments of the present disclosure may include: (1) long and controllable residence time of particles; (2) temperature uniformity without hot spots; (3) flexibility in handling particles of widely differing sizes, densities, and shapes; and (4) effective contact between gas and particles.

A circulating, bubbling fluidized bed (CBFB) may be operated in the transport mode, in which solid particles, carried over from the top of mold 40, may be separated and returned to the bottom of mold 40 via a downcomer 27 and feeding/control device 21. The transition from low-velocity fluidization to transport operation may occur when particle entrainment commences with increasing superficial gas velocity.

In one embodiment, a transition from bubbling pneumatic transport to a fast fluidization may be achieved with high superficial gas velocities. Downcomer 27 may return entrained particles back to the fluidized tank from the upflow riser, which may be composed, in part, of mold 40. When operating in this regime downcomer 27 may be decoupled. A pressure balance may be between the riser and the downcomer 27 to maintain steady operation. Standpipe-induced instability may result because solids may not be fed to the riser at the prescribed rate. To circumvent stand-pipe-induced instability, the solids inventory in the standpipe may be sufficiently high, or the riser may be uncoupled from the downcomer 27 by a fluidized tank, screw feeders, relief valves, or any combination thereof.

The concurrent gas-solids flow region may span a wide variety of flow regimes encountered in the circulating fluidized beds, with the lower limit set by the gas choking velocity. The voidage may refer to the fraction of volume occupied by the gas in the gas-solid suspension and may be influenced by the velocity of gas 70. Voidage may be a variable in circulating fluidized bed risers, including within mold 40. Since fluidized bed particles 50 and pressurized gas 70 may be nonconducting, capacitance may be easier to measure than electrical resistance or conductivity to determine voidage measurements within rotational molding system. Signal drift due to high humidity, temperature variations, powder buildup on the probe, and difficulty in delineating the exact measuring volume may be minimized. Other voidage measurement techniques may include X-ray and Gamma Ray densitometers and Tomographic images and 3-D density.

Mold 40 may be any suitable shape and size. Particle 50 feeding and recirculation near the bottom of the riser, as well as particle efflux from near the top, may be generally asymmetric, thereby leading to angular variations, including near the top and bottom of the riser. To overcome these angular variations and particle voidage differences, the mold 40 may undergo one axis movement or two axes movement, thereby providing uniform thermal heating conditions. Horizontal particle motion may be caused by interparticle collisions and gas turbulence. Unlike diffusion processes, the net transfer may be from a more dilute region (for example, core flow through the center of mold 40) to a denser region (for example, inside mold 40 walls).

The geometry and orientation of the entering and exit gas 70 effects may affect axial voidage profiles over a height beginning in the lower part of mold 40. One or more inlets may be employed, depending on the size, shape, and complexity of the thermoplastic part to be formed. The flow at the top of the riser may be affected by the geometry of the exit port through which the gas and solids may pass to the primary downflow pipe.

Some embodiments of the present disclosure may minimize asymmetry including: (1) the asymmetry of the exit; (2) degree of constriction; and (3) tortuosity of the flow path. A severe reduction in the diameter of exit may lead to a higher exit pressure drop. This may effect the overall pressure balance and reduce the efflux of solids from the riser for a given gas flowrate. The exit may act like a crude gas-solid separator. Any increase in curvature of the gas streamlines as the gas finds its way into the exit may make it more difficult for the particles to remain entrained and may increase internal refluxing of solids in the riser.

Rotational movement during the circulation of particles in both the heating and cooling cycles may aid in more uniform thermal transfer. In some embodiments, the mold exit may be central and smoothly tapered to minimize back mixing of gas and solids and prevent reflection from the top. For certain mold 40 aspect ratios, the solid particle holdup may be increased in the mold 40 to provide maximum residence time within mold 40.

A venturi contraction section may be used to promote particle acceleration and mixing for higher thermal heat transfer. The overall mixing behavior of the mold 40 may be characterized by the residence time distribution (RTD). Solids mixing may influence factors, such as gas-solids contacting, heat transfer, and solids conversion.

In addition, the temperature difference between the fluidized particles 50 and the inside walls of mold 40 may be smaller than the difference between oven temperatures and molds in traditional convection-based ovens. For example, a high convection oven for polypropylene may be 650° F. with a peak target external mold temperature of 500° F. and peak inside air mold temperature of 450° F. The fluidized particles 50 may only be 500° F. with a peak inside mold temperature of 475° F., thereby allowing the thermal mass of the mold to sinter the plastic. A more uniform temperature mold may result.

A method of determining the net solids circulation flux in a recirculating bubbling fluidized bed may be inferred from the downward flow in the standpipe or downcomer 27. Increasing temperature may lead to a reduction in gas turbulence because of the increased kinematic viscosity of the gas. Gas and particle mixing may depend on the flow regime, flow pattern, particle properties, and riser configuration.

Circulating fluidized bed molds may cover a range of sizes, from centimeters to tens of meters in lateral dimension. In some embodiments, the mold 40 may have characteristics to develop flow, including: (1) smooth-walled interior with roughness elements smaller than the diameter of the particles; (2) rounded corners without sharp edges or protruding surfaces; and (3) flat multi-orifice distributor towards the bottom. Suspension-to-wall heat transfer may be controlled by the flow of the solids and gas near the wall. Temperature gradients may be small within the mold 40 due to vigorous internal mixing of particles, while the gas and particle temperatures may be nearly equal locally. External fluidized bed heat exchangers may cool solids returning to the bottom of the mold 40 while the solids are being recirculated in the external loop. The bulk solids may be hotter or cooler than the internal wall of mold 40.

The overall heat transfer of fluidized bed particles 50 in vessel 51 may involve local variations in packing voidage, and effects of particle shape, distribution, and velocity. The overall heat transfer in the packed bed may comprise mechanisms, including: (1) the conduction heat transfer between particles 50 in both radial and axial directions; (2) the convective heat transfer between the bed particle 50 and the flow gas 70; (3) the interaction of said conduction and convection mechanisms; (4) heat transfer due to radiation between the bed particles 50, between the particles 50 and the flowing gas 70, and between the flowing gas 70 and inside bed wall 56; and (5) heat transfer between the bed wall and bed particles.

In some embodiments, the design of fluidized vessel 51 containing internal heat transfer coils may include a bed expansion ratio. In addition, each mold 40 may provide a displacement volume for the solid particles 50 contained within vessel 51. In some embodiments, the surface bubbling may be monitored with lasers or other measurement devices, and the pressure may be adjusted to maintain the bed at or slightly above the minimum fluidization point.

A high surface area of the particulate phase may contribute to an efficient transfer between particles of fluidized vessel 51. For example, a cubic meter of particles of diameter 100 µm may have a surface area of the order of 30,000 m$^2$. Gas-to-particle transfer may not be a limiting factor. Fluidized vessel 51 may maintain a uniform temperature throughout the bed volume due to this high surface area. The rate of heating or cooling of mold 40 may thus be dependent on the heat transfer between fluidized particle 50 and immersed surfaces. This overall heat transfer may be the summation of particle convective, gas convective, and radiative transfer coefficients.

The radiative component may be a factor above about 600° C. in bubbling beds and generally may not be a factor in processing the vast majority of thermoplastics. The bed-to-surface heat transfer may be an unsteady state process in which "packets" of emulsion-phase material may carry heat to or from the surface residing thereon for a period of time before moving back into the bulk of the bed and being replaced by fresh material. The rate of heat transfer may be at a maximum at the instant of contact but may decrease as the residence time of the packet at the surface increases and the local temperature gradient is reduced.

Increasing temperature may have at least two effects. For example, by decreasing gas density, the gas convective component of heat transfer may decrease. By increasing the thermal conductivity of the gas, the effectiveness of packets of emulsion phase in contact with the transfer surface may increase.

Heat may be transferred from the gas-solid mixture flowing through the vessel to water-cooled interior surfaces 56. The rotation of mold 40 within vessel 51 may ensure that any variation of hydrodynamic mechanisms, by which bed particles 50 and gas meet the immersed surface, are minimized. Selection of particle 50 may eliminate potential "stickiness" of the particle surfaces and the kinetic energy of the particles due to the fluid forces acting on them.

The vessel 51 may be constructed with tubes immersed in the fluidized particles 50. To take advantage of the heat transfer characteristics of gas fluidized vessel 51, the vessel may be lined with heating or cooling tubes, through which a suitable heat transfer fluid may be circulated. Supply or removal of heat in this way may serve to control the temperature of the bed. In addition, heat exchanging tubes may have an effect on the performance of the fluidized vessel.

To maintain an overall energy balance of the vessel 51, heat from the particle-gas medium may be transferred to some cooling surface, e.g., heat exchanger tubes. Various types of heat transfer may occur including, but not limited to: (1) submerged mold surface to particle-gas medium; (2) gas and particles; and (3) particle-gas medium to submerged exchanger tubes. Heat transfer between particle and gas phases may be rapid. Thus, the rate of heat transfer between particle and gas phases may be of less concern than the rate of heat transfer between the fluidized bed (particles and gas mixture) and submerged surfaces. Embodiments of the present disclosure contemplate the use various regimes of gas fluidization, such as; (1) dense bubbling fluidized bed and (2) fast circulating fluidized bed.

Heat transfer between particles 50 and gas 70 in a fluidized bed may be compared to gas convection from a single fixed particle 50, and to gas convection from a packed bed of fixed particles 50. In the case of a single particle 50, for example, the heat transfer mechanism may be a single-phase convection, governed by the boundary layer at the particle 50 surface. Heat transfer may increase with increasing velocity of the gas relative to the particles 50. Heat transfer may also increase with increasing thermal conductivity of particle 50, thereby increasing density of particle 50 and decreasing viscosity of the gas 70.

The rate of heat transfer between particles 50 and gas per unit bed volume may be high, due to the large interfacial surface area. Thermal equilibrium between particles 50 and gas 70 may be reached quickly within a short distance from the point of gas injection, in order to keep uniform temperatures around mold 40 on all sides and stages of rotation. Isothermal conditions may be accurately assumed throughout the particle-gas mixtures.

In some embodiments, dense bubbling fluidized vessel 51 may be cooled or heated. This may be accomplished by the insertion of heat transfer tubes (not shown) carrying cooling or heating fluids into the bed. Additionally, and/or alternatively, heat transfer tubes or electrical resistance heating elements may be incorporated into inner wall 56. Heat transfer may occur between the fluidized particle/gas medium and the submerged tube surfaces. Mechanisms contributing to heat transfer at submerged surfaces may include, for example: (1) gaseous convection during times of bubble gas 70 contact; (2) particle 50 conduction/convection during times of particle contact; and (3) radiation in the case of high-temperature operation. In some embodiments, bubbling fluidized beds may have the gaseous convection, and the presence of solid particles with the dense/particle phase contribution and convective contributions may add to rapid and uniform thermal changes to mold 40.

One approach to thermal transfer between particles 50 and mold 40 may be to assign a thermal resistance to a gaseous boundary layer at the heat transfer surface. Heat transfer may be attributed to the bombarding action of solid particles 50 on the gas film, thereby decreasing the effective film thickness. In some embodiments, this bombarding action may occur on the gaseous boundary layer and not on the actual surface of mold 40, thereby minimizing any abrasion effects. In some embodiments, heat exchanger tubes may be disposed in the freeboard space above the bed to recover thermal energy or to provide thermal energy for a separate process, such as preheating thermoplastic powder for injection into mold 40.

In some embodiments, an extended space above the dense fluidized particle 50 (e.g., freeboard 15) may be applied above vessel 51 to prevent particles 50 from being carried out of the unit by the air flow 70. The freeboard may separate the particles 50 from exhaust air 71. The loss of particles 50 related to entrainment may not be desirable. Entrainment may refer to the flux of solids carried out of the vessel 51 by the exhaust air 71. Elutriation may refer to the individual classifying effect of this entrainment, which may be characterized by individual size.

Bursting bubbles at the top surface of the fluidized particles 50 may be an ejection method. After particles 50 have been ejected into the freeboard with a starting velocity, they may decelerate and fall back to the fluidized bed. The freeboard height and gas velocity may be selected so that the upflowing gas 71 may not bring the particle 50 to the gas outlet. Entrainment may decrease with increasing freeboard height even for fluidized beds of fines, which may be entrainable. Particles 50 with a settling velocity higher than the gas 71 velocity may be entrained. Furthermore, particles 50 may not be moving individually through the freeboard. Instead, they may form clusters, which allow slip velocities between gas and particles that are higher than the single particle's terminal velocity.

Entrainment may occur when gas bubbles burst at the bed surface and throw particles 50 up into the freeboard 15 region. At low velocities of gas 70, particles 50 may quickly fall back into the vessel 51 and may be retained, but as the fluidizing velocity is increased, more particles 50 may be transported to heights above the bed surface. Freeboard 15 may have a certain height, at which the density gradient eventually falls to zero, thereby representing the transport disengaging height. If the gas velocity 71 in the freeboard 15 exceeds the terminal fall velocity of particles 50, then these particles 50 may be carried out of the system or "elutriated".

The particles 50 contained within vessel 71 may be in vigorous motion and may be subjected to mechanical stress due to interparticle collisions, bed-to-mold impacts, bed-to-tubes, and bed-to-wall impacts. This mechanical stress may lead to a gradual degradation of the individual bed particles, which may be referred to as attrition. Factors contributing to attrition may include, but is not limited to, the properties of bed particles 50, process design, and process conditions. The main consequence of attrition in fluidized vessel 71 may be the generation of fines that may not be kept inside the system. In some embodiments, exhaust air 71 may incorporate filters designed to handle the attrition. Fresh particles 50 may be employed to compensate for particles lost due to attrition or generally lost or consumed in the demolding cycle.

In some embodiments, bed particles 50 may be an attrition-resistant bed material. Friability tests may provide characteristics of particles 50 for the relative tendency of the material to undergo attrition. Various modes of attrition and factors affecting them may be addressed, such as degradation of particles 50 through fragmentation or abrasion. Rotating joints 24, 34 may be designed to prevent attrition caused by particles 50 impinging into the moving surfaces, which could lead to fragmentation. In some embodiments, pneumatic pressure feeding rotating joints 24, 34 may be greater than the internal fluid pressure exerted by the weight of the bed particles 50 contained within vessel 51.

Attrition may vary from pure abrasion to total fragmentation of the particles. With abrasion, only asperities may be removed from the particle's 50 surface. Abrasion, thus, may produce elutriable fines, whereas the particle size distribution of the mother particles may hardly change. In contrast, fragmentation may refer to a process of particle breakage into similarly sized pieces, resulting in broader particle size. The shape of particle 50 may be a factor in attrition. For example, irregular and angular particles may have their corners knocked off during collisions, and thus may become rounder and smaller with time. In some embodiments, particles 50 may possess macroscopically smooth surfaces, which may therefore make them less prone to breakage. The process conditions, which may result from the system design and operating conditions, may influence the attrition of the bed material by generating stress on the individual particles 50. Stress leading to attrition of a given bulk material may be mechanical stress due to, for example, compression, impact, or shear.

In conventional systems, bearings operating in high temperature applications may be unreliable due to premature failure. This may result in high costs and time wasted on frequent bearing replacements. Bearings may operate up to 660° F. At high temperatures, lubricating grease or oil may become thin. Oil that is too thin, in combination with low rotational speeds, may result in metal-to-metal contact in the bearing. This may cause wear, thereby leading to noise and excessive play. Grease may age rapidly at high temperatures, resulting in frequent relubrication. As such, this may be time consuming and costly. Frequent re-lubrication may also create the potential to over-fill the bearing, thereby increasing the risk of excess grease contaminating the fluidized particles and possibly catching fire. Additionally, old grease left in the bearings may carbonize at high temperatures and block the bearings. When temperatures rise above the bearing stabilization temperature, thermal expansion and material structural changes may occur in the bearing. This can lead to an uncontrolled loss of internal radial clearance, and, ultimately, seized bearings.

To address these shortcomings, in some embodiments of the present disclosure, the bearings may incorporate a graphite or ceramic-based lubrication which can lubricate at high temperatures and low speeds, reducing the risk of metal-to-metal contact. Additionally, and/or alternatively, bearings may be designed with a radial clearance to maintain radial clearance at high operating temperatures. This may help avoid bearing seizure and may facilitate a longer service life. In some embodiments, full ceramic bearings may be employed and may operate under temperature conditions of approximately 900° C.

In some embodiments, high temperature deep groove ball bearings may be implemented and may include either integral shields, external shields, or a combination of both to protect the bearings from the fluidized particles. Metallic or ceramic shields may prevent the ingress of proppant fluidized particles into the bearing. In some embodiments, metallic or ceramic shields may be non-contact, thereby generating little to no friction and minimal wear. In some embodiments, the bearings may include external seals, such as, for example, Nilos rings or sealing washers. Sealing washers may be filled with Teflon or other high temperature nickel-based material to seal the labyrinth seals from the fluidized particles. High temperature bearings may also be positively pressurized to a level greater than the pressure exerted at a set tank depth from the weight of the fluidized particles.

In some embodiments, air bearings, such as aerodynamic bearings and aerostatic bearings, may be employed to handle both the high temperature conditions and particle contaminant loading. Air bearings may use a thin film of pressurized gas to provide a low friction load-bearing interface between surfaces. The two surfaces may not touch, thus avoiding the traditional bearing-related problems of friction, wear, particulates, and lubricant handling. Supplying gas to the interface between moving elements of an aerostatic bearing can be achieved with several methods including, but not limited to: (1) porous surface; (2) partial porous surface; (3) discrete orifice feeding: (4) slot feeding; or (5) groove feeding.

In some embodiments, molds 40 internally conditioned by particles 50 may be manufactured out of thick-walled steel. For example, mold 40 may include one-inch thick steel walls. The steel-walled mold 40 may be preheated to 500° F. before thermoplastic particles 50, such as, for example, polypropylene powder, is injected into the interior surfaces of mold 40. In some embodiments, the heat of fusion for polypropylene powder may be 21 cal/g, the specific heat may be 0.46 cal/(g*C), and the specific gravity may be 0.92 g/cm$^3$. In some embodiments, the steel walls of mold 40 may include a specific heat of 500 J/(kg*K) and a specific gravity of 7.85 g/cm$^3$. In some embodiments, a drop-in mold temperature of 7° F. to 20° F. may be achieved for ⅛-inch thick parts, and a drop-in mold temperature 14° F. to 40° F. may be achieved for ¼-inch thick parts. The present disclosure therefore may therefore provide a reduction in thermal energy requirements for the formation of parts as the entire mold mass may not be required to go through a full temperature swing cycle necessary in conventional injection molding. Embodiments of the present disclosure contemplate the use of other mold materials that may provide characteristics for reduced energy consumption, such as, for example, aluminum, glass, or ceramic.

Preheating thermoplastic particles 50 may also provide for reductions in energy consumption. In some embodiments, thermoplastic powder may be preheated to 120° C. before being injected into the cavity of mold 40. The thermoplastic powder may be further heated to 230° C. by contact with the interior surfaces of mold 40 during the sintering process. Preheating the thermoplastic powder may provide a 43% reduction in the energy input into the thermoplastic powder while within mold 40 and further decreases in sintering times.

Conventional rotational molds may utilize thin walls of steel or thin walls of aluminum in order to conduct heat through their walls. This may make the molds susceptible to distortion and wear/tear during thermal cycles and mold-demold situations.

Any portion of the internal wall may come into intermittent contact with clusters of particles interspersed with usually brief periods, where that portion of the wall may be in contact with relatively dilute phase. Thermal particle convection transfer may rely on renewal of fresh particles 50 from the bulk, even though the transfer between the cluster and the wall may be conduction through the intervening gaseous medium. The thermal transfer coefficient may increase with the bulk density as well as bulk temperature. The convective heat transfer coefficient may decrease with increasing particle diameter for small heat transfer sections where clusters have brief residence times on the heat transfer surface. Mass transfer between gas and particles may affect gas-solids contact efficiencies in circulating bubbling fluidized molds. For the fast fluidization flow regime within mold 40, particles may travel downward near the wall, thereby causing axial dispersion of both solids and gas.

In fluidized bed vessel 51, fluid may be passed through a bed of solid particles 50 via distributor plate 72. At a fluid velocity above the minimum fluidization or minimum bubbling velocity, visible bubbles may appear. The fluid may pass through the bed in two phases, for example, a bubble phase and an emulsion phase. The mixing and circulation of bubble-induced solids may provide a liquidlike behavior of a bed of otherwise immobile solids. The liquidlike behavior of a fluidized bed may allow continuous feeding and withdrawal of bed material. The vigorous mixing of solids in the bed may provide a uniform bed temperature even for high temperature differences between particles and walls. The embodiments of the present disclosure may lead to an easier control and operation, thereby resulting in more uniform cross sections of the thermoplastic part.

In some embodiments, the deeper the particles 50 within vessel 51, the more coalescing and larger diameter of exploding bubbles may occur. The bubbles that may provide benefits of a fluidized vessel may represent the fluid bypassing and reduction of fluid-solids contacting. The mixing of solids in the bed may lead to nonuniform solids residence time distribution in the vessel. The rigorous solids mixing in the vessel may also lead to attrition of bed material and may increase the loss of bed material from elutriation and entrainment.

In some embodiments, mold 40 may be of a certain size and shape in which the bulk particles may have been injected within mold 40, and subsequently, the fluid may be supplied only through a centrally located inlet. If the fluid velocity is high and the mold 40 is low enough, the fluid stream may punch through the mold 40 exit. The centralized fluid stream may entrain solid particles and may leak through the entrance-mold interface into the mold to provide aeration for the particles in the mold. Preheated or precooled solid particles 50 may be continuously fed into mold 40 through a concentric jet or into the mold 40 region and continuously withdrawn from the mold region, just as in a fluidized vessel 51. A gas 71 recirculation zone may also be observed immediately adjacent to the gas 71 inlet due to the venturi effect above the jet nozzle. Due to solid particle continuity, at any mold level, the particle flowing up in the spout may be balanced by the particles moving down in the mold 40. This internal bulk shifting may serve to uniformly heat all mold surfaces to a constant temperature.

In some embodiments, the addition of a tubular insert 77 may change the operational and design characteristics of an internally heated and cooled rotational molding process. Particles descending in the downcomer 27 may be separately aerated. The gas distribution between the draft tube and the downcomer 27 may be adjusted by changing the design parameters at the draft tube inlet. In some embodiments, rather than operating the draft tube as a dilute-phase pneumatic transport tube, solids may be fluidized inside the draft tube at lower velocities to induce recirculation of the solid particles. A draft tube may operate as a solid phase pneumatic conveying or dilute phase pneumatic transport depending on the gas-particle mix.

In a gas fluidized vessel, the introduction of gas may be accomplished through distributors of various designs. Any time the gas is distributed through orifices or nozzles, a jetting region may appear above the grid. A fluctuation of bed density may occur in this zone, indicating mixing and contacting of solids and gas. The solids circulation pattern and solids circulation rate may be hydrodynamic characteristics of an operating jetting fluidized bed.

In some embodiments, mold 40 may rotate while preheated or precooled fluidized particles are introduced within. Rotating fluidized beds may allow bubble flow to oppose gravity, and thus, increase the uniformity of particle distribution and thermal uniformity.

In some embodiments, such as the embodiment in FIG. 13, solid particles may flow smoothly and consistently to and from the mold 40 by utilizing standpipes 27 and nonmechanical valves 21. Solid particles may flow in either dilute or dense-phase flow. Standpipes may be vertical, angled, or in continual angular rotation. The purpose of a standpipe may be to transfer fluidized solids into and out of a mold 40, operating at various pressures and temperatures. In some embodiments, a flowing, bubbling fluidized bed may be set up within mold 40 to preheat the mold for thermoplastic processing or to post-cool the formed thermoplastic with the inside walls. Large bubbles may be undesirable in a fluidized solids transport standpipe and may be formed with rise and growth by coalescence. Bubbles inside the transport tubes may reduce the density of the solids in the standpipe, thereby increasing overall transport energy cost. De-fluidization of particles 50 in the standpipe 27 may result in less solids flow rate around the loop. To maintain the solids in a fluidized state, aeration gas may be added to the standpipe. Adding an amount of gas uniformly may prevent de-fluidization.

In some embodiments, a sparger type of gas distributor may be used to fluidize particles within mold 40. The sparger may include a pipe with nozzles inserted through the bottom of mold 40 and branching outwards. Additionally, and/or alternatively, a cyclone fan may be placed above mold 40 to pull particles up and through mold 40, rather than being pushed up. In other embodiments, a positive pressure acting outward against the formed thermoplastic walls may be maintained to reduce possible warping of the part while rapidly cooling.

A nonmechanical solids flow device may refer to a device that uses only aeration gas in conjunction with its geometrical shape to cause particulate solids to flow through it. Nonmechanical solids flow devices may have no moving mechanical parts, which would be subject to wear and/or seizure. Nonmechanical flow devices may be operated in the valve mode to control the flow rate of particulate solids. In other embodiments, nonmechanical flow devices may be operated in automatic solids flow-through mode. In the valve mode of operation, the solids flow rate through the nonmechanical device may be controlled by the amount of aeration gas added to it. In some embodiments, nonmechanical valves may operate with particle sizes between 100 and 5000 microns.

In some embodiments, a seal pot may be utilized as an external bed into which the particles 50 may discharge via a straight dipleg. The particles and gas from the venturi pump and the fluidizing gas for the seal pot may be discharged via a downwardly angled return point.

Pneumatic conveying of particle 50 may include, for example: (1) conveying line; (2) air/gas mover; (3) feeder; (4) collector; and (5) controls. Positive pressure may be in the cooling phase, and vacuum pressure may be in the forming phase. Pneumatic conveying may be formed by dilute transport or dense phase flow. Embodiments of the present disclosure contemplate the use of any variety of feeders for pneumatic conveying systems of fluidized particles. For vacuum systems, an orifice device for free-flowing material may be employed. In some embodiments, an aspirator may be used to draw fluidized particles up into the mold 40. Filters or other collection devices may be utilized on all or some inlets to minimize contamination of the particles Embodiments of the present disclosure contemplate the use of any suitable type of air mover for dense or dilute phase transport, including, but not limited to, fans, blowers, compressors, or pumps. A blower may discharge air that is high in temperature, which may also heat the associated piping. In some embodiments, plastic particles may be conveyed, and the exit pressure may be limited to reduce the temperature of the conveying air and prevent plastic particles from softening and melting. Electrostatics or triboelectric effects in solids processing may also be encountered.

Instrumentation may be implemented in the rotational molding device 10 to address the multiphase, dynamic, and nonlinear nature of fluidized beds. Instrumentation may be used for process control, operator safety, detection of unusual behavior, and prevention of unwanted particle 50 losses. In some embodiments, the items to be monitored or measured may include, but are not limited to: (1) temperature; (2) gas differential pressure; (3) voidage/bed density/bed height/solids inventory; (4) solids mass flow rate/solids mass flux/solids velocity; (5) gas flow rate/gas velocity; (6) chemical composition of gas and solids; (7) particle characterization/particle size distribution (PSD); (8) bed structure and flow regime characterization, including bubble and cluster size. In some embodiments, pressure sensors may provide information on voidage, bed height, flow regime, or quality of fluidization. In other embodiments, the state of solid particles 50 and their distribution in the vessel 51 or internal to mold 40 may be detected from pressure gradient and pressure fluctuation.

Thermocouples may be used to operate the rotational molding device 10. In some embodiments, the optical pyrometer, which is a noninvasive temperature measurement device utilizing Planck's law, may be used to obtain temperature from radiant energy flux of a particular wavelength. To avoid the uncertainties of temperature measurement associated with the uncertainty of emissivity, a two-color pyrometer may be used, which analyzes the body radiation properties for two wavelengths. Additionally, and/or alternatively, an infrared (IR) thermometer may be used as a noninvasive tool to measure temperature. The overall heat flux in fluidized beds may comprise a radiative and a convective component monitored by heat flux probes.

Gas pressure sensing may be employed in fluidization and solids transport. The relationship between bed pressure drop and superficial gas velocity, as well as the pressure distribution along the bed determined by multiple pressure sensors on the column wall, may provide information on the fluidizing conditions. Minimum fluidization velocity may be determined based on vessel pressure drop and/or gas velocity relationship for decreasing gas velocity. In some embodiments, vessel pressure drop may be measured for decreasing velocity from a completely fluidized condition. The pressure drop may equal the bed weight divided by the bed cross section.

In some embodiments, the pressure may be detected using diaphragm sensors, such as metal strain gauge, piezoelectric semiconductor, electric capacitance, reluctance, and linear variable differential transformer sensors. Certain sensors may have drawbacks concerning the volumetric capacity of tubing and the ability to prevent the tube from solids plugging. For example, if the tube diameter is too narrow, the sensor may give a poor response. In some embodiments, sensors may be greater than 4 mm in diameter. To measure the particle 50 pressure separately from the gas 70 pressure, the chamber of the sensor covered by the diaphragm may have one or more bypass tubes to make the gas pressure inside equal to the outside, so that the diaphragm measures only the pressure from solids. Force sensors may be used to determine the bulk solid flow in bubbling fluidized beds.

Light-related phenomena may refer to radiant quantities and psychophysical parameters categorized as luminous quantities. Light emitted to a fluidized particle 50 suspension may be scattered. Due to the light scatter, the relative decrease of light transmission through the suspension may be proportional to the suspension volumetric concentration. Light sources, which may be applied to fluidized bed measurement, may include, for example, halogen, mercury, metal halide, light emitting diodes, and lasers of various types including gas, solid, and semiconductor. Other types may also be used, including, for example, photodetectors, optical fibers, optical fiber probe, and laser doppler velocimetry (LDV). LDV may enable measuring the local fluid velocities from the frequency of light reflection from fine seed tracer particles placed within the vessel 51. In some embodiments, microphones may be deployed because acoustic emission from fluidized vessel 51 may also provide information on hydrodynamic conditions, Some embodiments may utilize the techniques for in-situ determination of particle size and shape developed for granulation.

The embodiments of the present disclosure are not limited in scale or size. Numerous modifications and variations will readily occur to persons skilled in the art. The present disclosure is not limited to the exact construction and operation illustrated and described. All suitable modifications and equivalents may be resorted to, falling within the scope of the present disclosure.

What is claimed is:
1. A rotational molding device, comprising:
a frame;

a vessel coupled to the frame, the vessel configured to be heated or cooled; and a mold coupled to the frame, the mold configured to rotate about a first axis by a first rotation mechanism and configured to rotate about a second axis by a second rotation mechanism;

wherein the vessel includes a particle bed comprising a plurality of fluidized particles, wherein the mold is configured to form a molded part, wherein the mold comprises a cavity corresponding to a shape of the molded part, and wherein the mold comprises at least one aperture configured to selectively transport the fluidized particles into and out of the cavity to heat or cool the molded part.

2. The rotational molding device of claim 1, wherein the plurality of fluidized particles comprises at least one of thermoplastic particles and proppants.

3. The rotational molding device of claim 1, wherein:
the plurality of fluidized particles comprises proppants; and
the proppants comprise at least one of silica sand, glass beads, aluminum microspheres, aluminum oxide sand, resin-coated microspheres, and ceramic microspheres.

4. The rotational molding device of claim 1, wherein the first rotation mechanism is a first bearing, and the second rotation mechanism is a second bearing.

5. The rotational molding device of claim 4, wherein the first and second bearings include at least one of ball bearings, air bearings, aerodynamic bearings, and aerostatic bearings.

6. The rotational molding device of claim 1, further comprising at least one of chilled water pipes and pressurized fluidizing air configured to cool the particle bed comprising the plurality of fluidized particles.

7. The rotational molding device of claim 1, further comprising at least one heating element disposed in an interior of the vessel configured to heat the particle bed comprising the plurality of fluidized particles.

8. The rotational molding device of claim 7, wherein the at least one heating element includes at least one of steam pipes, pre-heated compressed air, hot water pipes, and direct solar heating.

9. The rotational molding device of claim 1, further comprising a thermoplastic injection unit configured to deposit molten thermoplastic material through an aperture into the mold.

10. The rotational molding device of claim 1, further comprising at least one coating apparatus configured to deliver electrostatically-charged thermoplastic powder onto interior surfaces of the mold.

11. A rotational molding device, comprising:
a frame;
a vessel coupled to the frame; and
a mold coupled to the frame, the mold configured to rotate about a first axis by a first rotation mechanism and configured to rotate about a second axis by a second rotation mechanism;

wherein the vessel comprises a particle bed comprising a plurality of fluidized particles, wherein the mold is configured to form a molded part, wherein the mold comprises a cavity corresponding to a shape of the molded part, and wherein the mold comprises at least one aperture configured to selectively circulate the fluidized particles into and out of the cavity to heat or cool the molded part.

12. The rotational molding device of claim 11, wherein the at least one aperture is configured to:
discharge the fluidized particles from the cavity of the mold into the vessel to empty the cavity of the mold; and
introduce thermoplastic powder into the cavity of the mold after the fluidized particles are discharged from the cavity of the mold.

13. The rotational molding device of claim 12, wherein the thermoplastic powder is heated and dried prior to being introduced into the cavity of the mold.

14. The rotational molding device of claim 11, wherein the mold is configured to be rotated about the first axis and the second axis through arc patterns.

15. The rotational molding device of claim 11, wherein the mold is composed of a material comprising at least one of steel, aluminum, ceramic, stone, and concrete.

16. The rotational molding device of claim 11, wherein the vessel comprises an inner wall, an outer wall, and thermal insulation disposed between the inner wall and the outer wall.

17. The rotational molding device of claim 11, wherein external surfaces of the mold are formed of insulating material.

18. The rotational molding device of claim 11, further comprising at least one coating apparatus configured to deliver electrostatically-charged thermoplastic powder onto interior surfaces of the mold.

19. A rotational molding system, comprising:
a frame;
a vessel coupled to the frame, the vessel configured to be heated or cooled;
a mold coupled to the frame, the mold configured to rotate about a first axis by a first rotation mechanism and configured to rotate about a second axis by a second rotation mechanism; and
an injection unit configured to deposit molten thermoplastic material into a cavity of the mold to form a molded thermoplastic part;
wherein the vessel comprises a particle bed comprising a plurality of fluidized particles,
wherein the cavity of the mold corresponds to a shape of the molded thermoplastic part, and
wherein the mold comprises at least one aperture configured to selectively transport the fluidized particles into and out of the cavity to heat or cool the molded part.

* * * * *